(12) United States Patent
Zong et al.

(10) Patent No.: US 12,087,245 B2
(45) Date of Patent: Sep. 10, 2024

(54) DISPLAY APPARATUS AND DRIVING METHOD THEREFOR

(71) Applicant: BOE Technology Group Co., Ltd., Beijing (CN)

(72) Inventors: Shaolei Zong, Beijing (CN); Jigang Sun, Beijing (CN); Weixin Jiang, Beijing (CN); Bin Wang, Beijing (CN); Wei Sun, Beijing (CN); Xin Duan, Beijing (CN); Shuhuan Yu, Beijing (CN); Kexin Hao, Beijing (CN); Jiaqi Fan, Beijing (CN); Zhaoyun Gu, Beijing (CN); Shaoru Zhang, Beijing (CN); Tieshi Wang, Beijing (CN); Kuanjun Peng, Beijing (CN); Xue Dong, Beijing (CN); Wei Qin, Beijing (CN); Weixing Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/037,043

(22) PCT Filed: Nov. 20, 2020

(86) PCT No.: PCT/CN2020/130658
§ 371 (c)(1),
(2) Date: May 15, 2023

(87) PCT Pub. No.: WO2022/104750
PCT Pub. Date: May 27, 2022

(65) Prior Publication Data
US 2023/0410761 A1 Dec. 21, 2023

(51) Int. Cl.
G09G 3/36 (2006.01)
G06T 15/00 (2011.01)
H04N 13/383 (2018.01)

(52) U.S. Cl.
CPC ........... *G09G 3/3674* (2013.01); *G06T 15/00* (2013.01); *H04N 13/383* (2018.05); *G09G 2354/00* (2013.01)

(58) Field of Classification Search
CPC .. G09G 3/3674; G09G 2354/00; G09G 3/003; G09G 3/36; G06T 15/00;
(Continued)

(56) References Cited

U.S. PATENT DOCUMENTS

2003/0214476 A1 11/2003 Matsuda et al.
2006/0232541 A1 10/2006 Kudo et al.
(Continued)

FOREIGN PATENT DOCUMENTS

CN 1460982 A 12/2003
CN 103969834 A 8/2014
(Continued)

OTHER PUBLICATIONS

CN202080002922.X first office action.
PCT/CN2020/130658 international search report.

*Primary Examiner* — Premal R Patel
(74) *Attorney, Agent, or Firm* — PLLC

(57) ABSTRACT

A display apparatus and a driving method therefor. The driving method includes: determining a gaze area and a non-gaze area of a user on a display apparatus in real time (S10); and driving the gaze area for image displaying at a first resolution, and driving the non-gaze area for image displaying at a second resolution, wherein the first resolution is higher than the second resolution. By using of the display apparatus, image resolution can be adjusted according to different areas, so as to realize high-resolution image display in a display area at which a user gazes and realize low-resolution image display in other areas, thereby reducing
(Continued)

power consumption and achieving reasonable allocation of resources on the premise of ensuring the user experience.

20 Claims, 17 Drawing Sheets

(58) Field of Classification Search
CPC .. H04N 13/383; H04N 13/361; H04N 13/305; H04N 13/398
See application file for complete search history.

(56) References Cited

U.S. PATENT DOCUMENTS

| | | |
|---|---|---|
| 2014/0210875 A1 | 7/2014 | Sumi et al. |
| 2017/0345384 A1 | 11/2017 | Ma et al. |
| 2019/0139472 A1 | 5/2019 | Liu |
| 2019/0147786 A1* | 5/2019 | Kim ............... H10K 59/35 345/690 |
| 2019/0230343 A1* | 7/2019 | Huh ................ G02B 3/0006 |
| 2019/0339770 A1* | 11/2019 | Kurlethimar ........ G02B 27/017 |
| 2019/0340979 A1 | 11/2019 | Yang et al. |
| 2020/0118476 A1* | 4/2020 | Kim ................ G09G 3/2003 |
| 2020/0242997 A1 | 7/2020 | Xue et al. |
| 2022/0311991 A1 | 9/2022 | Hong |

FOREIGN PATENT DOCUMENTS

| | | |
|---|---|---|
| CN | 105810173 A | 7/2016 |
| CN | 106297672 A | 1/2017 |
| CN | 106531110 A | 3/2017 |
| CN | 107195278 A | 9/2017 |
| CN | 107783304 A | 3/2018 |
| CN | 110632767 A | 12/2019 |

* cited by examiner

DISPLAY APPARATUS AND DRIVING METHOD THEREFOR

CROSS-REFERENCE TO RELATED APPLICATIONS

This application is a National Stage of International Application No. PCT/CN2020/130658, filed Nov. 20, 2020, which is hereby incorporated by reference in its entirety.

FIELD

The present disclosure relates to the technical field of display, in particular to a display device and a drive method therefor.

BACKGROUND

Glasses-free three-dimensional (3D) technology can obtain space and depth perception without any auxiliary device. With the increasing requirements of observation experience from users, high-definition display resolution and glasses-free 3D display technology are gradually applied to a display screen.

A high-definition display screen can have 4K or higher resolution, and can achieve high-definition stereoscopic display effects by combining the glasses-free 3D technology, so as to provide the users with a more realistic display experience. However, full-screen high-definition 3D display requires very great data transmission bandwidth, and can inevitably cause unnecessary data resource waste at a non-gaze area due to a limited gaze area on the screen.

SUMMARY

An embodiment of the present disclosure provides a display device. The display device includes: a substrate; a plurality of pixel islands located on the substrate, where the pixel island includes a plurality of sub-pixels in different colors, all the sub-pixels are arranged in an array in a first direction and a second direction, sub-pixels in the same color in one pixel island are arranged in a row in the first direction, sub-pixel rows in different colors are arranged in the second direction, and the first direction and the second direction intersect with each other; a plurality of data lines arranged in the first direction and extending in the second direction, where sub-pixels arranged in the same column in the second direction are connected to the same data line; a multiplexing circuit located in the second direction at a side of an area where all the pixel islands are located, where the data lines are connected to the multiplexing circuit separately; a drive chip located in the second direction at a side, facing away from the pixel island, of the multiplexing circuit, where the multiplexing circuit is connected to the drive chip; a controller connected to the drive chip, and configured to provide a drive signal for the drive chip; and a microlens layer located at a side, facing away from the substrate, of the pixel island, the microlens layer modulating emergent light of the pixel island, so as to map the sub-pixels in the pixel island into a pixel array and implement three-dimensional display on same; where sub-pixel columns in one pixel island are divided into a plurality of sub-pixel groups in the first direction, and the sub-pixel groups include the same number of sub-pixel columns; and the multiplexing circuit includes a plurality of first multiplexing units arranged in the first direction, the first multiplexing unit includes one input end and a plurality of output ends, the first multiplexing units are connected to the sub-pixel groups in a one-to-one correspondence mode, the output ends of the first multiplexing unit are connected to data lines corresponding to the sub-pixel groups respectively, and the input end of the first multiplexing unit is connected to the drive chip.

In some embodiments of the present disclosure, the multiplexing circuit further includes: a plurality of first-switch control signal lines, the first-switch control signal lines extending in the first direction and arranged in the second direction; where the first multiplexing unit includes: a plurality of first-switch transistors, control poles of the first-switch transistors are connected to the first-switch control signal lines, first poles of the first-switch transistors are connected to the output ends of the first multiplexing unit, and second poles of the first-switch transistors are connected to the input end of the first multiplexing unit; and in one first multiplexing unit, the control poles of the first-switch transistors are connected to different first-switch control signal lines respectively, and the first poles of the first-switch transistors are connected to different output ends of the first multiplexing unit respectively.

In some embodiments of the present disclosure, the multiplexing circuit further includes: a plurality of control units located in the second direction at a side, facing away from the pixel island, of the first multiplexing unit, where the control units are arranged in the first direction, the control unit includes an input end and an output end, and the control units are connected to the first multiplexing units in a one-to-one correspondence mode; and the output end of the control unit is connected to the input end of the first multiplexing unit, and the input end of the control unit is connected to the drive chip.

In some embodiments of the present disclosure, the multiplexing circuit further includes: a control signal line extending in the first direction, where the control unit includes: a control switch transistor, a control pole of the control switch transistor is connected to the control signal line, a first pole of the control switch transistor is connected to the output end of the control unit, and a second pole of the control switch transistor is connected to the input end of the control unit.

In some embodiments of the present disclosure, the multiplexing circuit further includes: a plurality of second multiplexing units located in the second direction at the side, facing away from the pixel island, of the first multiplexing unit, where the second multiplexing units are arranged in the first direction; the second multiplexing unit includes a plurality of input ends and a plurality of output ends, and the number of the input ends is less than the number of the output ends; and the second multiplexing units are connected to a plurality of pixel islands arranged in the first direction in a one-to-one correspondence mode, the output ends of the second multiplexing unit are connected to data lines corresponding to the sub-pixel columns in the pixel islands respectively, and the input ends of the second multiplexing unit are connected to the drive chip separately.

In some embodiments of the present disclosure, the multiplexing circuit further includes: a plurality of second-switch control signal lines, where the second-switch control signal lines extend in the first direction and arranged in the second direction; and a plurality of third-switch control signal lines, where the third-switch control signal lines extend in the first direction and arranged in the second direction, where the second multiplexing unit includes: a plurality of second-switch transistors and a plurality of third-switch transistors; a control pole of the second-switch transistor is connected to the second-switch control signal line, a first pole of the second-switch transistor is connected to the output end of the second multiplexing unit, a second pole of the second-switch transistor is connected to a first pole of the third-switch transistor, a control pole of the third-switch transistor is connected to the third-switch control signal line, and a second pole of the third-switch transistor is connected to the input end of the second multiplexing unit; in one second multiplexing unit, control poles of second-switch transistors connected to the same pixel island are connected to the same second-switch control signal line, control poles of second-switch transistors connected to different pixel islands are connected to different second-switch control signal lines, and second poles of second-switch transistors connected to sub-pixel columns at the same position in the pixel islands are connected to each other; in one second multiplexing unit, the third-switch transistors correspond to one of pixel islands connected to the second multiplexing unit, and in the third-switch transistors and second-switch transistors corresponding to the pixel island, first poles of the third-switch transistors are connected to second poles of the second-switch transistors respectively; in one second multiplexing unit, the third-switch transistors are divided into a plurality of third-switch transistor groups in the first direction, and the number of the third-switch transistor groups equals the number of sub-pixel groups included in one pixel island; and in one third-switch transistor group, control poles of the third-switch transistors are connected to different third-switch control signal lines respectively, and second poles of the third-switch transistors are connected to the same input end of the second multiplexing unit.

In some embodiments of the present disclosure, the display device further includes: a plurality of gate lines extending in the first direction and arranged in the second direction, where sub-pixels arranged in the same row in the first direction are connected to the same gate line; and a gate drive circuit located in the first direction at one side or two sides of an area where the pixel island is located, where the gate lines are connected to the gate drive circuit separately, where the gate drive circuit includes a plurality of gate drive units arranged in the second direction, the gate drive units are cascaded with each other in the second direction, and the gate drive units independently scan corresponding sub-pixel rows.

In some embodiments of the present disclosure, the display device further includes: a camera configured to photograph eyes of a user, so as to allow the controller to determine, according to an image shot by the camera, a gaze area of the user on the display device, and control the drive chip to drive the gaze area and a non-gaze area to implement image display at different resolution.

In some embodiments of the present disclosure, the microlens layer includes at least one liquid crystal lens layer.

In some embodiments of the present disclosure, the pixel island includes sixteen red sub-pixels, sixteen green sub-pixels and sixteen blue sub-pixels, the red sub-pixels, the green sub-pixels and the blue sub-pixels are arranged in three rows in the first direction and sixteen columns in the second direction, and one pixel island is mapped by the microlens layer to form sixteen pixels arranged in four rows and four columns; sub-pixels in one pixel island are divided into four sub-pixel groups in the first direction, and each sub-pixel group includes four sub-pixel columns; and the multiplexing circuit includes four first-switch control signal lines, one first multiplexing unit includes four first-switch transistors, control poles of the four first-switch transistors are connected to the four first-switch control signal lines respectively, first poles of the four first-switch transistors are connected to data lines corresponding to four sub-pixel columns in one sub-pixel group, and second poles of the four first-switch transistors are connected to each other to the drive chip.

In some embodiments of the present disclosure, one first multiplexing unit is connected to the drive chip through one corresponding control unit; and the multiplexing circuit includes one control signal line, and the control units each include one control switch transistor; control poles of the control switch transistors are connected to one control signal line, a first pole of the control switch transistor in one control unit is connected to the second poles of the four first-switch transistors in one first multiplexing unit, and a second pole of the control switch transistor is connected to the drive chip.

In some embodiments of the present disclosure, the multiplexing circuit includes two second-switch control signal lines and four third-switch control signal lines; one second multiplexing unit is correspondingly connected to two pixel islands arranged in the first direction, and the two pixel islands are a first pixel island and a second pixel island; one second multiplexing unit includes thirty-two second-switch transistors, sixteen second-switch transistors in one second multiplexing unit are connected to data lines of the first pixel island respectively, and the other sixteen second-switch transistors are connected to data lines of the second pixel island respectively; control poles of the sixteen second-switch transistors corresponding to the first pixel island are all connected to one second-switch control signal line, and control poles of the sixteen second-switch transistors corresponding to the second pixel island are all connected to the other second-switch control signal line; first poles of the second-switch transistors corresponding to the first pixel island are connected to data lines of the first pixel island respectively, and first poles of the second-switch transistors corresponding to the second pixel island are connected to data lines of the second pixel island respectively; and second poles of two second-switch transistors corresponding to sub-pixel columns located at the same positions in the first pixel island and the second pixel island are connected to each other; one second multiplexing unit includes sixteen third-switch transistors, the sixteen third-switch transistors correspond to the first pixel island, and the sixteen third-switch transistors are divided into four third-switch transistor groups in the first direction; and control poles of four third-switch transistors in one third-switch transistor group are connected to the four third-switch control signal lines respectively, a second pole of a second-switch transistor corresponding to the same sub-pixel column is connected to a first pole of the third-switch transistor, and second poles of the four third-switch transistors are connected to one another and connected to the drive chip.

An embodiment of the present disclosure further provides a drive method for any said display device above. The drive method includes: determining a gaze area and a non-gaze area of a user on the display device in real time; and driving the gaze area to implement image display at first resolution, and driving the non-gaze area to implement image display at second resolution, where the first resolution is higher than the second resolution.

In some embodiments of the present disclosure, the display device includes a camera; and the determining a gaze area and a non-gaze area of a user on the display device in real time includes: controlling the camera to photograph eyes of the user in real time; determining the gaze area of the user on the display device according to an image shot by the camera; and determining the remaining area on the display device except the gaze area as the non-gaze area.

In some embodiments of the present disclosure, the determining the gaze area of the user on the display device according to an image shot by the camera includes: determining positions of a left eye and a right eye of the user relative to a display surface of the display device according to the image shot by the camera; determining a left-eye gaze area of the left eye of the user on the display device and a right-eye gaze area of the right eye of the user on the display device respectively according to the positions of the left eye and the right eye of the user relative to the display surface of the display device and a distance between the user and the display device; and using an overlap area of the left-eye gaze area and the right-eye gaze area as the gaze area of the user on the display device.

In some embodiments of the present disclosure, a single-eye gaze area of the user on the display device is determined in a formula as follows:

$$S=\pi(A \tan 15°)^2;$$

where S represents the single-eye gaze area of the user on the display device, and A represents the distance between the user and the display device.

In some embodiments of the present disclosure, before the driving the gaze area to implement image display at first resolution, and driving the non-gaze area to implement image display at second resolution, the drive method further includes: determining a display mode selected by the user; and the driving the gaze area to implement image display at first resolution, and driving the non-gaze area to implement image display at second resolution include: driving the gaze area to implement two-dimensional image display at the first resolution, and driving the non-gaze area to implement two-dimensional image display at the second resolution under the condition that the display mode selected by the user is a two-dimensional display mode; and driving the gaze area to implement three-dimensional image display at the first resolution, and driving the non-gaze area to implement two-dimensional image display at the second resolution under the condition that the display mode selected by the user is a three-dimensional display mode; and alternatively, driving the gaze area to implement three-dimensional image display at the first resolution, and driving the non-gaze area to implement three-dimensional image display at the second resolution under the condition that the display mode selected by the user is a three-dimensional display mode.

In some embodiments of the present disclosure, the driving the gaze area to implement two-dimensional image display at the first resolution, and driving the non-gaze area to implement two-dimensional image display at the second resolution under the condition that the display mode selected by the user is a two-dimensional display mode include: receiving two-dimensional image data, performing image rendering on the two-dimensional image data at the first resolution for the gaze area, and performing image rendering on the two-dimensional image data at the second resolution for the non-gaze area; and controlling first-switch control signal lines corresponding to the gaze area to sequentially output active level signals, sequentially turning on first-switch transistors in a first multiplexing unit to transmit different two-dimensional image data, controlling first-switch control signal lines corresponding to the non-gaze area to simultaneously output active level signals, simultaneously turning on the first-switch transistors in the first multiplexing unit to transmit the same two-dimensional image data, driving the gaze area to implement the two-dimensional image display at the first resolution, and driving the non-gaze area to implement the two-dimensional image display at the second resolution.

In some embodiments of the present disclosure, the driving the gaze area to implement three-dimensional image display at the first resolution, and driving the non-gaze area to implement three-dimensional image display at the second resolution under the condition that the display mode selected by the user is a three-dimensional display mode include: receiving three-dimensional image data, performing image rendering on the three-dimensional image data at the first resolution for the gaze area, and performing image rendering on the three-dimensional image data at the second resolution for the non-gaze area; and controlling first-switch control signal lines corresponding to the gaze area to sequentially output active level signals, sequentially turning on first-switch transistors in a first multiplexing unit to transmit different three-dimensional image data, controlling first-switch control signal lines corresponding to the non-gaze area to simultaneously output active level signals, simultaneously turning on the first-switch transistors in the first multiplexing unit to transmit the same three-dimensional image data, driving the gaze area to implement the three-dimensional image display at the first resolution, and driving the non-gaze area to implement the three-dimensional image display at the second resolution.

In some embodiments of the present disclosure, the driving the gaze area to implement three-dimensional image display at the first resolution, and driving the non-gaze area to implement two-dimensional image display at the second resolution under the condition that the display mode selected by the user is a three-dimensional display mode include: receiving three-dimensional image data, and converting three-dimensional image data corresponding to the non-gaze area into two-dimensional image data; performing image rendering on the three-dimensional image data at the first resolution for the gaze area, and performing image rendering on the two-dimensional image data at the second resolution for the non-gaze area; and controlling first-switch control signal lines corresponding to the gaze area to sequentially output active level signals, sequentially turning on first-switch transistors in a first multiplexing unit to transmit different three-dimensional image data, controlling first-switch control signal lines corresponding to the non-gaze area to simultaneously output active level signals, simultaneously turning on the first-switch transistors in the first multiplexing unit to transmit the same two-dimensional image data, driving the gaze area to implement the three-dimensional image display at the first resolution, and driving the non-gaze area to implement the two-dimensional image display at the second resolution.

In some embodiments of the present disclosure, scanning duration of a gate drive unit corresponding to the gaze area is longer than scanning duration of a gate drive unit corresponding to the non-gaze area.

In some embodiments of the present disclosure, the drive method further includes: increasing a drive current of the drive chip for the non-gaze area, and making a difference between charging degrees of sub-pixels in the gaze area and the non-gaze area less than a set threshold.

In some embodiments of the present disclosure, a gate drive circuit of the display device includes a plurality of gate drive units, and a multiplexing circuit of the display device further includes a plurality of second multiplexing units and a plurality of control units; the drive method includes: driving control switch transistors of the control units to keep turned-off; under the condition that a plurality of adjacent pixel islands are driven to load the same image data, controlling an output signal of a gate drive unit connected to an $n^{th}$ row of sub-pixels and an output signal of a gate drive unit connected to an $n+3^{th}$ row of sub-pixels to be the same, where n is an integer greater than or equal to 1; and controlling second-switch control signal lines to simultaneously output active level signals, simultaneously turning on second-switch transistors in the second multiplexing unit, and loading the same image data by the plurality of adjacent pixel islands; and under the condition that pixel islands are driven to load different image data, controlling second-switch control signal lines to sequentially output active level signals, sequentially turning on second-switch transistors connected to different pixel islands in the second multiplexing unit, and loading different image data by the pixel islands; and a drive method for the same pixel island includes: controlling third-switch control signal lines to simultaneously output active level signals, and simultaneously turning on third-switch transistors in a second multiplexing unit to transmit the same image data; and alternatively controlling third-switch control signal lines to sequentially output active level signals, and sequentially turning on third-switch transistors in a second multiplexing unit to transmit different image data.

BRIEF DESCRIPTION OF THE DRAWINGS

In order to describe technical solutions in embodiments of the present disclosure more clearly, accompanying drawings required by the embodiments of the present disclosure are briefly described below. Apparently, the accompanying drawings in the following description are merely some embodiments of the present disclosure, and a person of ordinary skill in the art can further derive other accompanying drawings from these accompanying drawings without creative efforts.

DETAILED DESCRIPTION OF THE EMBODIMENTS

Figure 1:
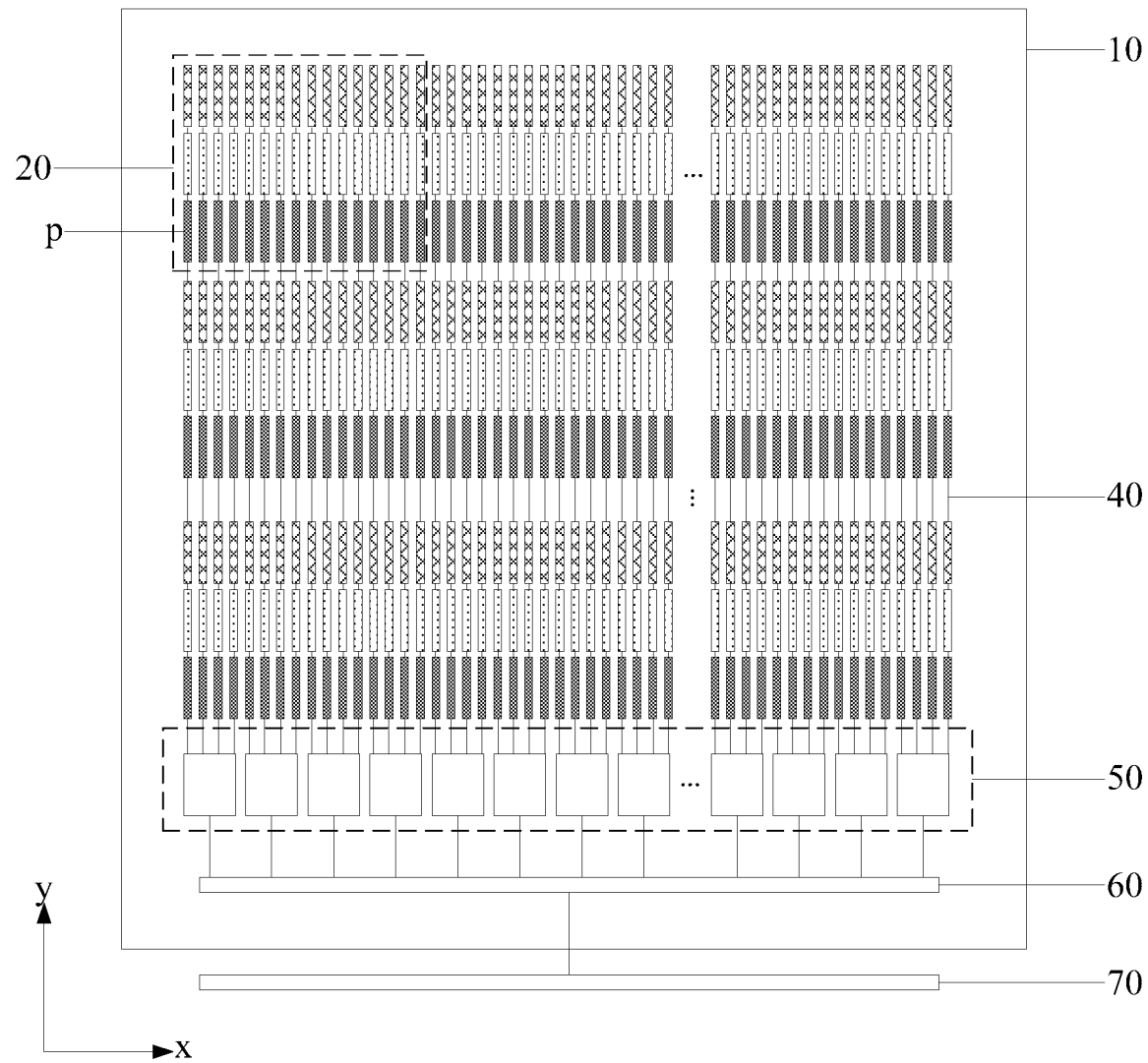
FIG. 1 is a first schematic structural diagram of a display device according to an embodiment of the present disclosure.

In order to make the above objective, features, and advantages of the present disclosure clearer and more comprehensible, the present disclosure will be further described below in conjunction with accompanying drawings and embodiments. However, illustrative implementation modes can be implemented in many forms and should not be constructed as being limited to the implementation modes set forth herein; but instead, these implementation modes are provided such that the present disclosure will be more thorough and complete, and the concept of the illustrative implementation modes will be fully conveyed to those skilled in the art. In the accompanying drawings, the same reference numerals indicate the same or similar structures, and their repeated description will be omitted as a result. The words expressing positions and directions described in the present disclosure are all described by taking the accompanying drawings as examples, but can also be modified according to needs, and all modifications shall fall within the protection scope of the present disclosure. The accompanying drawings of the present disclosure are merely used for illustrating relative positional relations rather than representing true proportions.

Stereoscopic vision is produced based on binocular parallax during observation of real world. A three-dimensional (3D) display device designed according to this principle usually needs to combine with glasses, etc. for separating light incident on a left eye and a right eye, so as to achieve a three-dimensional display effect. Three-dimensional display implemented in the above mode usually focuses human eyes on the same position for a long time, causing visual fatigue and making a user have a bad experience such as dizziness accordingly.

Three-dimensional display based on light field technology may overcome the above problems and implement glasses-free 3D display. In light field display, a microlens array is arranged a light-emitting side of a display panel, emergent light of the display panel is modulated by the microlens array to form a plurality of viewpoints to be incident on human eyes, and an image watched by human eyes comes from different viewpoints, such that the watched image comes from different directions, which is similar to the situation that human eyes watch real scenes, and overcomes the problem of visual fatigue.

Figure 2:
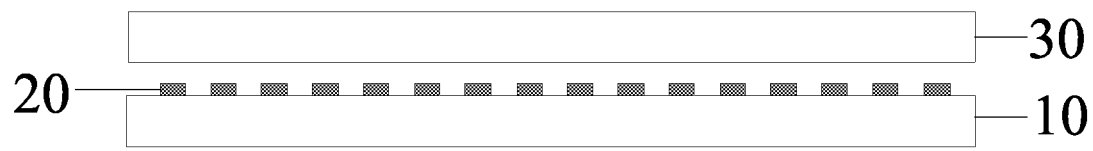
FIG. 2 is a schematic structural diagram of a section of a display device according to an embodiment of the present disclosure.

FIG. 1 is a first schematic structural diagram of a display device according to an embodiment of the present disclosure, and FIG. 2 is a schematic structural diagram of a section of a display device according to an embodiment of the present disclosure.

As shown in FIGS. 1 and 2, the display device according to the embodiment of the present disclosure includes:

a substrate 10, where the substrate 10 is generally located at a bottom of the display device, and has functions of supporting and bearing other components. The substrate 10 has a size usually basically the same as a size of the display device, and has a shape usually set as a rectangle. When the display device is a special-shaped display device, the substrate has a shape and size adapted to the display device. The substrate is usually made of glass, which is not limited herein;

a plurality of pixel islands 20 located on the substrate 10, where the pixel island 20 includes a plurality of sub-pixels p in different colors, all the sub-pixels p are arranged in an array in a first direction x and a second direction y, sub-pixels p in the same color in one pixel island 20 are arranged in a row in the first direction x, sub-pixel p rows in different colors are arranged in the second direction y, and the first direction x and the second direction y intersect with each other.

During specific implementation, the pixel islands 20 may have the same structure, and the pixel islands 20 are arranged in an array in the first direction X and the second direction Y.

Figure 3A:
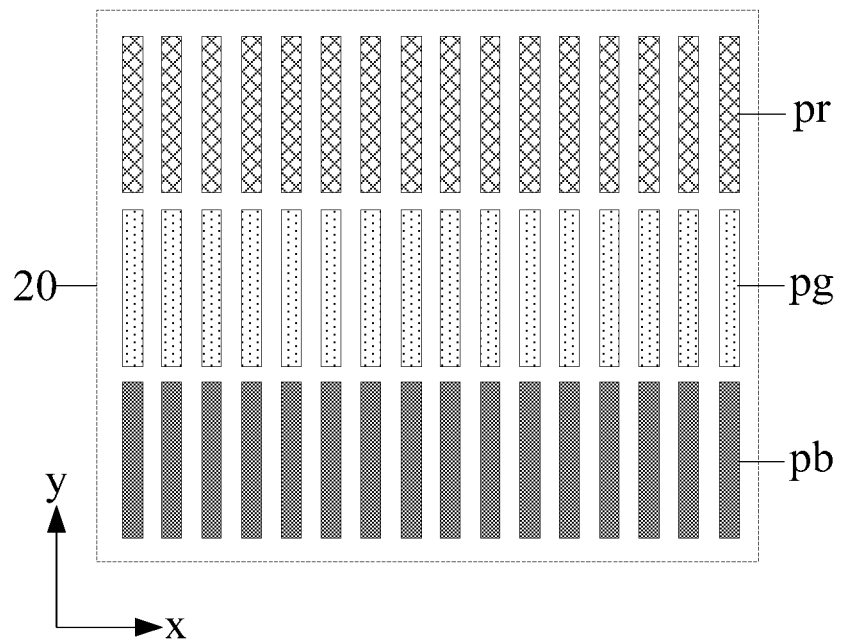
FIG. 3A is a schematic structural diagram of a sub-pixel arrangement of a pixel island according to an embodiment of the present disclosure.

FIG. 3A is a schematic structural diagram of a sub-pixel arrangement of a pixel island according to an embodiment of the present disclosure.

As shown in FIG. 3A, one pixel island 20 may include three primary colors of sub-pixels, for example, the pixel island 20 includes red sub-pixels pr, green sub-pixels pg and blue sub-pixels pb. The number of the red sub-pixels pr, the number of the green sub-pixels pg and the number of the blue sub-pixels pb are the same. The red sub-pixels pr are arranged in a row in the first direction x. The green sub-pixels pg are arranged in a row in the first direction x. The blue sub-pixels pb are arranged in a row in the first direction x. A red sub-pixel row, a green sub-pixel row and a blue sub-pixel row are arranged in the second direction y, such that the sub-pixels in the pixel island 20 are arranged in an array. The first direction x and the second direction y may be two directions perpendicular to each other, the first direction x may be a horizontal direction, and the second direction y may be a vertical direction, which is not limited herein.

As shown in FIG. 2, the display device according to the embodiment of the present disclosure further includes: a microlens layer 30. The microlens layer 60 is located at a side, facing away from the substrate 10, of the pixel island 20. The microlens layer 30 is composed of a microlens array, and the microlens layer 30 modulates emergent light of the pixel island 20, so as to map the pixel island 20 into a pixel array for image display. By using a structure combining the pixel island 20 and the microlens layer 30, imaging resolution may be improved on the basis of a physical arrangement limit of the sub-pixels.

Figure 3B:
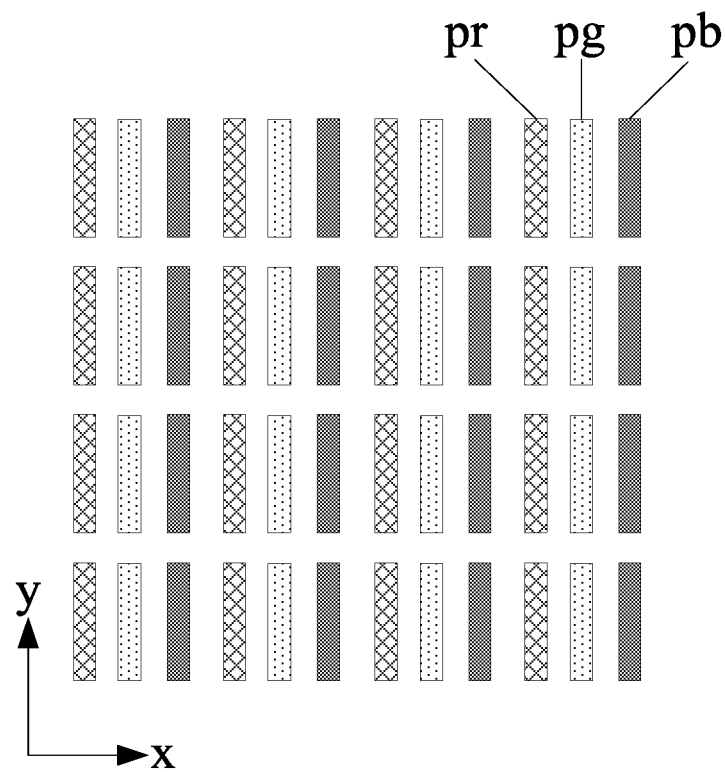
FIG. 3B is a schematic diagram of a pixel arrangement structure after pixel island mapping according to an embodiment of the present disclosure.

FIG. 3B is a schematic diagram of a pixel arrangement structure after pixel island mapping according to an embodiment of the present disclosure.

When a pixel island with a structure shown in FIG. 3A is used, the pixel arrangement structure shown in FIG. 3B may be formed after pixel mapping by combining the microlens layer 30. As may be seen from FIG. 3B, mapped red sub-pixels pr, green sub-pixels pg and blue sub-pixels pb are arranged in a fixed order, and one red sub-pixel pr, one green sub-pixel pg and one blue sub-pixel pb that are adjacent to one another form one pixel. Mapped pixels have the same arrangement structure as traditional pixels, and one pixel island may be mapped into a pixel array composed of a plurality of pixels, such that image display resolution may be improved by using the pixel island structure.

The microlens layer 30 is not only used for pixel mapping of the sub-pixels in the pixel island, but also may modulate the outgoing light of the pixel island, such that final display data of the pixel island form a plurality of viewpoints, and three-dimensional light field display is implemented.

During specific implementation, the microlens layer 30 may use at least one liquid crystal lens. By applying an electrical signal to the liquid crystal lens, liquid crystal molecules may be controlled to generate a set phase delay that is equivalent to an effect of the lens. It is certain that the above microlens layer may also directly use a microlens array composed of microlenses having a set shape to achieve the same function, which is not limited herein. A structure and a function of the microlens layer will be described below by taking the microlens layer using the liquid crystal lens as an example, and an arrangement mode and principle for using a solid microlens are similar to an arrangement mode and principle of the liquid crystal lens, and will not be repeated in detail.

The microlens layer 30 may include only one liquid crystal lens, the liquid crystal lens is equivalent to a microlens array composed of hemispherical microlenses, and the liquid crystal lens may simultaneously map pixels and implement three-dimensional light field display. The emergent light of the sub-pixels in the pixel island may be mapped into a pixel array after passing through the liquid crystal lens, and a plurality of viewpoints are formed, thus implementing three-dimensional light field display.

For example, when the pixel island 20 uses the structure shown in FIG. 3A, the microlens layer 30 may use (or be equivalent to) 16 hemispherical microlenses arranged in an array on the light-emitting side of the pixel island 20, such that the pixel island 20 may be mapped into the pixel array shown in FIG. 3B, forming up to 16 viewpoints, and implementing three-dimensional light field display.

In some other embodiments, the microlens layer 30 may also use two layers of liquid crystal lenses. A liquid crystal lens near the pixel island may play the role of pixel mapping, and the other liquid crystal lens far away from the pixel island may modulate the emergent light to implement three-dimensional light field display. Both layers of lenses may use a hemispherical microlens structure, and the number of microlenses matches the number of the sub-pixels in the pixel island, which is not limited herein.

In some other embodiments, the microlens layer 30 includes two layers of liquid crystal lenses. One layer of liquid crystal lens is equivalent to a microlens array composed of hemispherical microlenses, and the other layer of liquid crystal lens is equivalent to a microlens array composed of cylindrical lenses. The two liquid crystal lenses are not controlled at the same time, and vary in modulation principle of light. The microlens array using the hemispherical lenses may implement three-dimensional light field display, and the microlens using the cylindrical lenses may implement three-dimensional display with numerous viewpoints.

For example, when the pixel island 20 uses the structure shown in FIG. 3A, one layer of liquid crystal lens may be equivalent to 16 cylindrical lenses that correspond to different sub-pixel columns respectively, such that the emergent light of the pixel island may be mapped into the pixel array shown in FIG. 3B, some light are deflected in a direction of the left eye, the other part of light is deflected in a direction of the right eye, thus implementing three-dimensional display. Another layer of liquid crystal lens may be equivalent to 16 hemispherical microlenses arranged in an array on the light-emitting side of the pixel island 20, such that the pixel island 20 may be mapped into the pixel array shown in FIG. 3B, forming up to 16 viewpoints, and implementing three-dimensional light field display.

Embodiments of the present disclosure does not limit the number of sub-pixels in the pixel island and the corresponding number of liquid crystal lenses used, as well as an operation means for implementing three-dimensional display by controlling the liquid crystal lens.

As shown in FIG. 1, on the basis that the display device includes the pixel island having the pixel arrangement structure above, the display device further includes:
  a plurality of data lines 40 arranged in the first direction x and extending in the second direction y, and sub-pixels arranged in the same column in the second direction y are connected to the same data line 40. The data line 40 is used to transmit image data to the sub-pixel, and the sub-pixel displays corresponding brightness of the image data;
  a multiplexing circuit 50 located in the second direction y at a side of an area where all the pixel islands 20 are located. The data lines 40 are connected to a multiplexing circuit 50. The multiplexing circuit 50 is applied to the display device, and a small number of drive pins may be used for time-sharing drive of different data lines, thereby reducing the number of drive pins and saving resources;
  a drive chip 60 located in the second direction y at a side, facing away from the pixel island 20, of the multiplexing circuit 50. The multiplexing circuit 50 is connected to the drive chip 60. The drive chip 60 has a plurality of connection pins, an input end of the multiplexing circuit 50 is connected to the pin of the drive chip 60, and output ends of the multiplexing circuit 50 are connected to the data lines 40 in turn. The number of the input ends is less than the number of the output ends. Image data output by the pins of the drive chip 60 may be transmitted to the data lines 40 through the multiplexing circuit 50, such that one pin of the drive chip 60 may control the plurality of data lines 40;
  a controller 70 connected to the drive chip 60, and configured to provide a drive signal for the drive chip 60. The controller 70 may receive two-dimensional image data or three-dimensional image data for image display, and the controller 70 determines whether a current display mode is a three-dimensional display mode or a two-dimensional display mode according to selection by the user. Then corresponding image data are provided for the drive chip 60 according to a predetermined display partition, and the drive chip 60 provides the image data for the data lines at a set drive current under control by the controller 70.

During specific implementation, a central area of the display device may be used as a high-definition display area, and other areas except the central area may be used as auxiliary display areas, such that the central area may implement image display at high resolution and the auxiliary display area may implement image display at low resolution. In this way, power consumption may be reduced without reducing the display effect.

The display device according to the embodiment of the present disclosure may further include a camera c. The camera c is configured to photograph eyes of the user, so as to allow the controller 70 to determine, according to an image shot by the camera c, a gaze area of the user on the display device, and control the drive chip 60 to drive the gaze area to implement image display at high resolution, and drive a non-gaze area to implement image display at low resolution.

Figure 4:
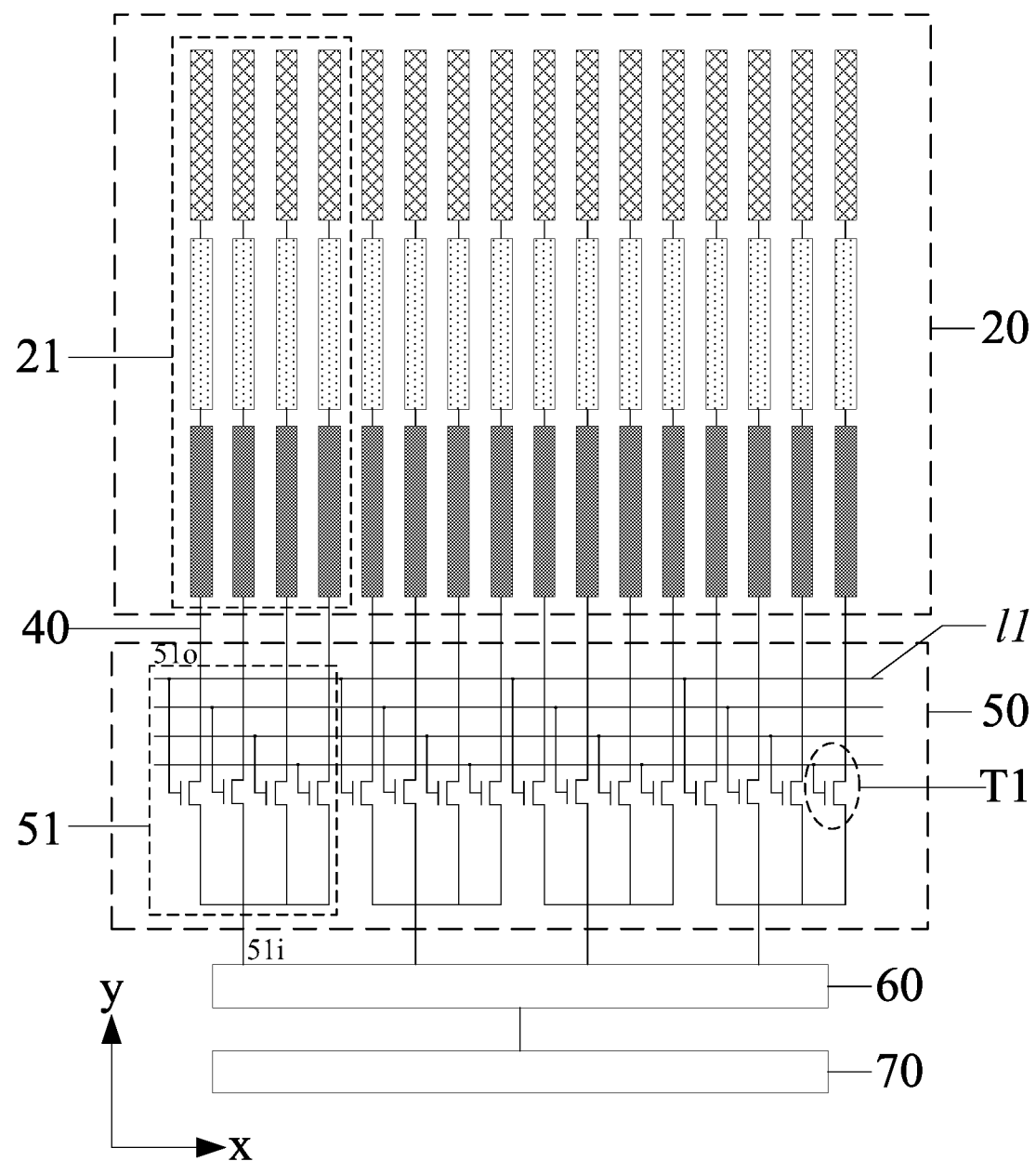
FIG. 4 is a first partial enlarged view of a display device according to an embodiment of the present disclosure.

FIG. 4 is a first partial enlarged view of a display device according to an embodiment of the present disclosure.

As shown in FIG. 4, sub-pixel columns in one pixel island 20 are divided into a plurality of sub-pixel groups 21 in the first direction x, and the sub-pixel groups 21 include the same number of sub-pixel columns.

The multiplexing circuit 50 includes a plurality of first multiplexing units 51 arranged in the first direction x, the first multiplexing unit 51 includes one input end 51i and a plurality of output ends 51o, the first multiplexing units 51 are connected to the sub-pixel groups 21 in a one-to-one correspondence mode, the output ends 51o of the first multiplexing unit 51 are connected to data lines 40 corresponding to the sub-pixel groups respectively, and the input end 51i of the first multiplexing unit 51 is connected to the drive chip 60.

In some embodiments of the present disclosure, image data written by one sub-pixel group 21 are transmitted through one first multiplexing unit 51. When the output ends 51o of the first multiplexing unit 51 are sequentially turned on, image data input by the input end 51i may be sequentially transmitted to different data lines 40 corresponding to the sub-pixel group 21, such that different data lines 40 may transmit different image data to the sub-pixels. When different image data are written onto the sub-pixels in one pixel island 20, the maximum number of viewpoints may be formed, such that high-resolution image display may be implemented. When the output ends 51o of the first multiplexing unit 51 are simultaneously turned on, image data input by the input end 51i are simultaneously transmitted to different data lines 40 corresponding to the sub-pixel group 21, such that different data lines 40 may transmit the same image data to the sub-pixels. When the same image data are written onto the same row of pixels in one sub-pixel group 21, a plurality of pixels are used for displaying the same image data equivalently, such that the number of viewpoints may be reduced, and low-resolution image display may be implemented.

According to the above drive rules, the gaze area of the display device of the user may be controlled to implement image display at high resolution, and the non-gaze area may be controlled to implement image display at low resolution, such that a data transmission amount of the non-gaze area may be reduced, pixel charging time of the non-gaze area may be shortened, saved time may be used to improve an image refresh rate, and the gaze area has a better display effect and the power consumption of the display device may be reduced.

Alternatively, as shown in FIG. 4, the multiplexing circuit 50 further includes: a plurality of first-switch control signal lines l1, the first-switch control signal lines l1 extending in the first direction x and arranged in the second direction y.

The first multiplexing unit 51 includes: a plurality of first-switch transistors T1, control poles of the first-switch transistors are connected to the first-switch control signal lines l1, first poles of the first-switch transistors are connected to the output ends 51o of the first multiplexing unit, and second poles of the first-switch transistors are connected to the input end 51i of the first multiplexing unit.

As shown in FIG. 4, the number of first-switch transistors T1 included in one first multiplexing unit 51 is equal to the number of first-switch control signal lines l1. In one first multiplexing unit 51, the control poles of the first-switch transistors T1 are connected to different first-switch control signal lines l1 respectively, the first poles of the first-switch transistors T1 are connected to different output ends 51o of the first multiplexing unit respectively, and the second poles of the first-switch transistors T1 are connected to the input ends 51i of the first multiplexing unit.

The first-switch transistor T1 in the first multiplexing unit 51 is controlled by the first-switch control signal lines l1 to be turned on or off respectively. In this way, when the first-switch control signal lines l1 sequentially output active level signals to sequentially turn on the first-switch transistors T1, signals at the input end 51i are sequentially transmitted to the first poles through the second poles of the first-switch transistors T1, such that different image data may be sequentially transmitted to different data lines connected to the first-switch transistors T1, and different image data may be written onto a plurality rows of sub-pixels for high-resolution image display. When the first switching signal lines l1 simultaneously output active level signals, the first-switch transistors T1 may be controlled to be simultaneously turned on, signals at the input end 51i are transmitted to the first poles through the second poles of the first-switch transistors T1, such that the signals may be simultaneously output to the plurality of data lines 40 through the first-switch transistors T1, and the same image data may be simultaneously written onto a plurality columns of sub-pixels for low-resolution image display.

Figure 5:
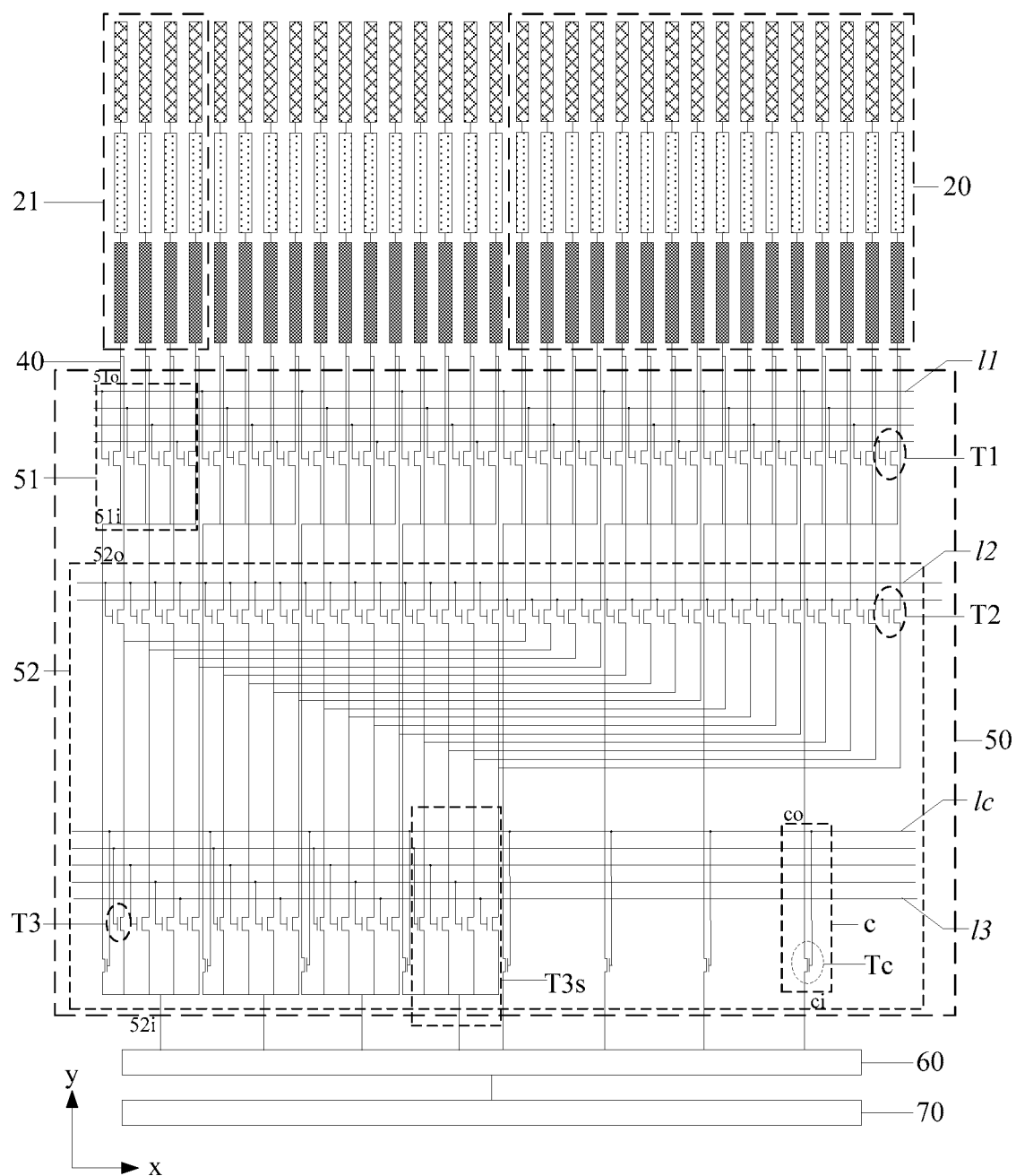
FIG. 5 is a second partial enlarged view of a display device according to an embodiment of the present disclosure.

FIG. 5 is a second partial enlarged view of a display device according to an embodiment of the present disclosure.

As shown in FIG. 5, the multiplexing circuit 50 further includes: a plurality of control units c. The plurality of control units c are located in the second direction y at a side, facing away from the pixel island 20, of the first multiplexing unit 51, where the control units c are arranged in the first direction x. The control unit c includes an input end ci and an output end co, and the control units c are connected to the first multiplexing units 51 in a one-to-one correspondence mode; and the output end co of the control unit is connected to the input end 51i of the first multiplexing unit 51, and the input end ci of the control unit c is connected to the drive chip 60.

As may be seen from FIG. 5, the first multiplexing unit 51 is connected to the drive chip 60 through the control unit c. The control unit c is used to control whether to start the first multiplexing unit 51 for transmitting image data to the data line 40, that is, the control unit c is equivalent to a switch of the first multiplexing unit 51, and the first multiplexing unit 51 may implement the above drive merely when the control unit c is in a turn-on state. When the control unit c is in a turned-off state, the first multiplexing unit 51 may not be controlled.

Alternatively, the multiplexing circuit 50 further includes: a control signal line lc extending in the first direction x.

The control unit c includes: a control switch transistor Tc, a control pole of the control switch transistor Tc is connected to the control signal line lc, a first pole of the control switch transistor Tc is connected to the output end co of the control unit, and a second pole of the control switch transistor Tc is connected to the input end ci of the control unit.

The control switch transistor Tc is controlled by the control signal line lc to be turned on or off. When the control signal line lc outputs an active level signal, the control switch transistor Tc is turned on, and a signal at the input end ci is transmitted to the first pole through the second pole of the control switch transistor Tc, such that the image data output by the drive chip may be transmitted to the first multiplexing unit 51 through the control switch transistor Tc, and then transmitted to the connected data lines 40 through the first multiplexing unit 51. When the control signal line lc does not output an active level signal, the control switch transistor Tc is turned off, such that the image data output by the drive chip may no longer be transmitted to the first multiplexing unit 51 through the control switch transistor Tc, and the first multiplexing unit 51 is invalid in this case.

The display device according to embodiments of the present disclosure may implement three-dimensional light field display, and the number of viewpoints may be controlled by controlling the first-switch transistor T1 in the first multiplexing unit 51, thereby controlling the display resolution of the display device.

As shown in FIG. 5, in the display device according to the embodiment of the present disclosure, the multiplexing circuit 50 may further include: a plurality of second multiplexing units 52, the plurality of second multiplexing units 52 being located in the second direction y at the side, facing away from the pixel island 20, of the first multiplexing unit 51, where the second multiplexing units 52 are arranged in the first direction x. The second multiplexing unit 52 includes a plurality of input ends 52i and a plurality of output ends 52o, and the number of the input ends 52i is less than the number of the output ends 52o; and the second multiplexing units 52 are connected to a plurality of pixel islands 20 arranged in the first direction x in a one-to-one correspondence mode, the output ends 52o of the second multiplexing unit 52 are connected to data lines 40 corresponding to the sub-pixel columns in the pixel islands respectively, and the input ends 52i of the second multiplexing unit 52 are connected to the drive chip 60 separately.

The second multiplexing unit 52 is simultaneously connected to the plurality of pixel islands 20, such that based on such a connection relation, different image data may be sequentially transmitted to the pixel islands 20 or the same image data may be simultaneously transmitted to the pixel islands 20, in this way, the resolution of the data transmitted to the pixel island 20 may be controlled while the number of viewpoints generated by the pixel island is controlled, and image resolution of the display device is controlled accordingly.

Alternatively, as shown in FIG. 5, the multiplexing circuit 50 further includes:
 a plurality of second-switch control signal lines l2, the second-switch control signal lines l2 extending in the first direction x and arranged in the second direction y; and
 a plurality of third-switch control signal lines l3, the third-switch control signal lines l3 extending in the first direction x and arranged in the second direction y.

It may be seen from FIG. 5 that the first-switch control signal line l1, the second-switch control signal line l2, the second-switch control signal line l3 and the control signal line lc extend in the same direction, and may extend in the first direction x and be arranged in the second direction y.

The second multiplexing unit 52 includes: a plurality of second-switch transistors T2 and a plurality of third-switch transistors T3.

A control pole of the second-switch transistor T2 is connected to the second-switch control signal line l2, a first pole of the second-switch transistor T2 is connected to the output end 52o of the second multiplexing unit 52, a second pole of the second-switch transistor T2 is connected to a first pole of the third-switch transistor T3, a control pole of the third-switch transistor T3 is connected to the third-switch control signal line l3, and a second pole of the third-switch transistor T3 is connected to the input end 52i of the second multiplexing unit 52.

In some embodiments of the present disclosure, the number of second-switch transistors T2 included in one second multiplexing unit 52 is equal to the number of data lines 40 connected to one second multiplexing unit 52. For example, one second multiplexing unit 52 is connected to two pixel islands 20, and each pixel island 20 includes 16 columns of sub-pixels. Then one pixel island 20 is connected to 16 data lines, and two pixel islands 20 are connected to 32 data lines, such that the second multiplexing unit 52 includes 32 second-switch transistors T2.

The number of third-switch transistors T3 included in one second multiplexing unit 52 is equal to the number of sub-pixel columns included in one pixel island 20. For example, if one pixel island 20 includes 16 columns of sub-pixels, the second multiplexing unit 52 includes 16 third-switch transistors T3.

In one second multiplexing unit 52, control poles of second-switch transistors T2 connected to the same pixel island 20 are connected to the same second-switch control signal line l2, control poles of second-switch transistors T2 connected to different pixel islands 20 are connected to different second-switch control signal lines l2, and second poles of second-switch transistors T2 connected to sub-pixel columns at the same position in the pixel islands 20 are connected to each other.

Figure 6:
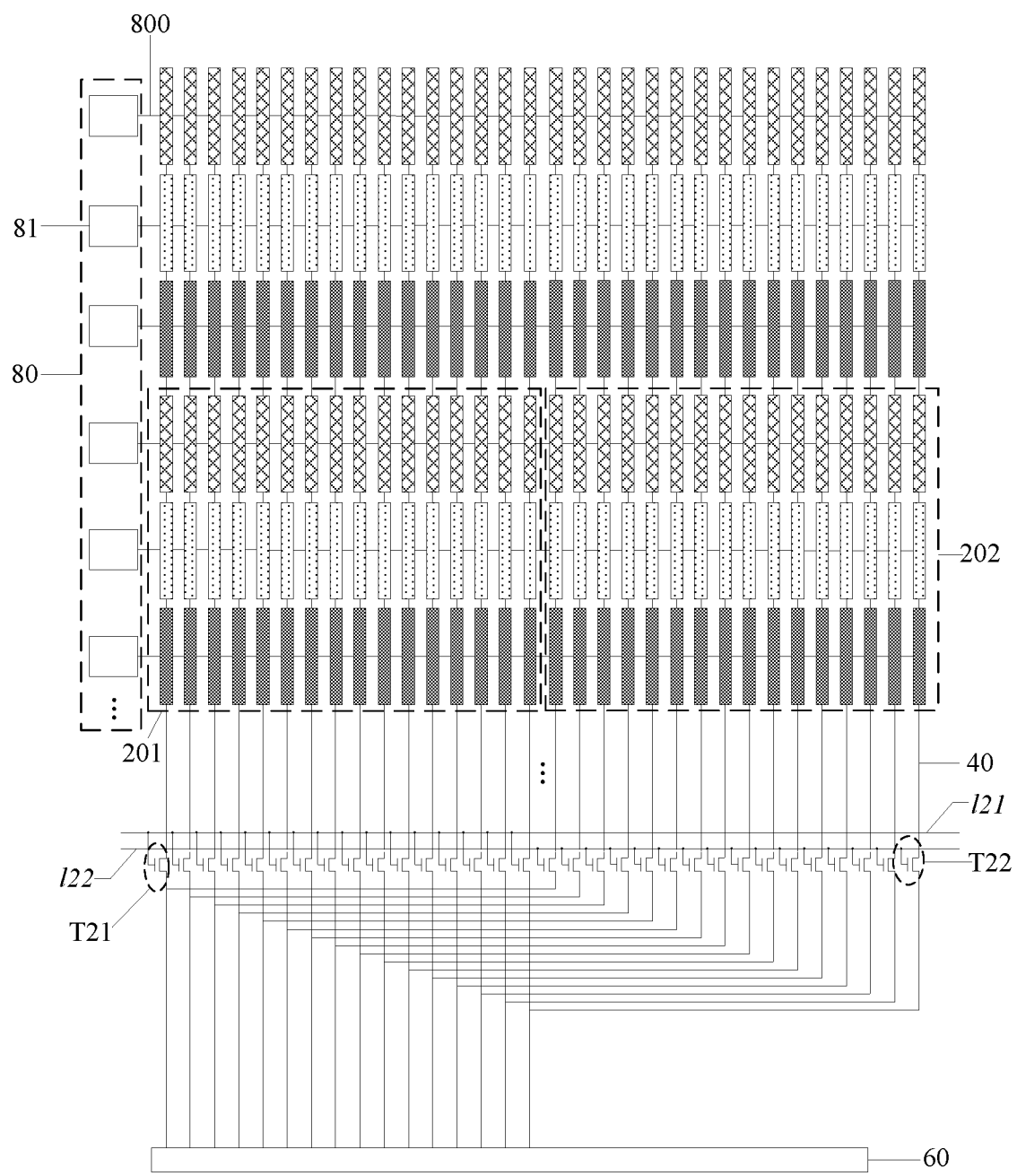
FIG. 6 is a partial enlarged view of a second multiplexing unit according to an embodiment of the present disclosure.

FIG. 6 is a partial enlarged view of a second multiplexing unit according to an embodiment of the present disclosure.

As shown in FIG. 6, by taking a second multiplexing unit simultaneously controlling two pixel islands as an example, each pixel island includes 16 columns of sub-pixels, and the multiplexing circuit includes two second-switch control signal lines (l21 and l/22). Control poles of 16 second-switch transistors T21 connected to a first pixel island 201 are connected to the first second-switch control signal line l21, and control poles of 16 second-switch transistors T22 connected to the second pixel island 202 are connected to the second second-switch control signal line l22. A second pole of a second-switch transistor T21 connected to a first column of sub-pixels of the first pixel island 201 is connected to a second pole of a second-switch transistor T22 connected to a first column of sub-pixels of the second pixel island 202. A second pole of a second-switch transistor T21 connected to a second column of sub-pixels of the first pixel island 201 is connected to a second pole of a second-switch transistor T22 connected to a second column of sub-pixels of the second pixel island 202, by analogy, second poles of second-switch transistors connected to the first pixel island are connected to second poles of second-switch transistors connected to the same positions of the second pixel island respectively.

When the two second-switch control signal lines sequentially transmit active level signals, image data may be transmitted to the first pixel island 201 and the second pixel island 202 respectively. Specifically, when one of the second-switch control signal lines l21 transmits the active level signal, and the other second-switch control signal line l22 has no signal, the second-switch transistors T21 connected to the first pixel island 201 are turned on, and the second-switch transistors T22 connected to the second pixel island 202 are turned off. Then the image data output by the drive chip 60 may be transmitted to the data lines of the first pixel island 201 through the second-switch transistors T21 connected to the first pixel island 201. When one of the second-switch control signal lines l21 has no signal, and the other second-switch control signal line l22 transmits the active level signal, the second-switch transistors T21 connected to the first pixel island 201 are turned off, and the second-switch transistors T22 connected to the second pixel island 202 are turned on. Then the image data output by the drive chip 60 may be transmitted to the data lines of the second pixel island 202 through the second-switch transistors T22 connected to the second pixel island 202. Thus, different image data are written onto the first pixel island 201 and the second pixel island 202 respectively.

When the two second-switch control signal lines simultaneously transmit the active level signal, the image data may be simultaneously transmitted to the first pixel island 201 and the second pixel island 202 respectively. Specifically, when the second-switch control signal lines l21, second-switch control signal line l22 simultaneously transmit the active level signal, the second-switch transistors T21 connected to the first pixel island 201 and the second-switch transistors T22 connected to the second pixel island 202 are simultaneously turned on. Then the image data output by the drive chip 60 may be transmitted to the data lines of the first pixel island 201 through the second-switch transistors T21 connected to the first pixel island 201, and may be simultaneously transmitted to the data lines of the second pixel island 202 through the second-switch transistors T22 connected to the second pixel island 202. In this case, image data written onto the first pixel island 201 and the second pixel island 202 are the same, which is equivalent to increasing of a size of pixels for image display and reducing of image resolution in the case of image display.

As shown in FIG. 5, in one second multiplexing unit 52, the third-switch transistors T3 correspond to one pixel island 20 connected to the second multiplexing unit 52, and in the third-switch transistors T3 and second-switch transistors T2 corresponding to the pixel island 20, first poles of the third-switch transistors T3 are connected to second poles of the second-switch transistors T2 respectively.

Since second poles of a plurality of second-switch transistors T2 corresponding to sub-pixel columns at the same positions of different pixel islands are connected together, data may be written onto a plurality of pixel islands merely by transmitting image data to the second pole of the second-switch transistor T2 corresponding to one pixel island, and transmitting an active level signal by the second-switch control signal line, thereby reducing drive pins.

In some embodiments of the present disclosure, the number of third-switch transistors T3 is equal to the number of sub-pixel columns included in one pixel island 20. For example, one second multiplexing unit 52 is connected to two pixel islands, and the first pixel island includes 16 columns of sub-pixels, such that it is necessary to use 32 second-switch transistors T2 and 16 third-switch transistors. First poles of the 16 third-switch transistors T3 are connected to second poles of 16 second-switch transistors T2 connected to one pixel island respectively. In this way, image data may be transmitted to the second-switch transistor T2 through the third-switch transistor T3.

As shown in FIG. 5, in one second multiplexing unit 52, the third-switch transistors T3 are divided into a plurality of third-switch transistor groups T3s in the first direction x, and the number of the third-switch transistor groups T3s equals the number of sub-pixel groups 21 included in one pixel island 20; and in one third-switch transistor group T3s, control poles of the third-switch transistors T3 are connected to different third-switch control signal lines 13 respectively, and second poles of the third-switch transistors T3 are connected to the same input end 52i of the second multiplexing unit 52.

In some embodiments of the present disclosure, image data written onto one sub-pixel group 21 are controlled to be transmitted through one third-switch transistor group T3s, such that the number of third-switch transistor groups T3s included in one second multiplexing unit 52 is equal to the number of sub-pixel groups 21 included in one pixel island 20. In addition, the number of third-switch transistors T3 included in each third-switch transistor group T3s is the same as the number of third-switch control signal lines 13 included in the multiplexing circuit 50.

The third-switch transistors T3 are controlled by the third-switch control signal lines 13 to be turned on or off respectively. In this way, when the third-switch control signal lines 13 sequentially output active level signals to sequentially turn on the third-switch transistors T3, signals at the input end 52i are sequentially transmitted to the first poles through the second poles of the third-switch transistors T3, such that different image data may be sequentially transmitted to the second-switch transistors T2 connected to the third-switch transistors. Further, the image data are controlled by the second-switch control signal line 12 to be simultaneously or sequentially transmitted to different pixel islands. When the third switching signal lines 13 simultaneously output active level signals, the third-switch transistors T3 may be controlled to be simultaneously turned on, signals at the input end 52i are transmitted to the first poles through the second poles of the third-switch transistors T3, such that the same image data may be simultaneously transmitted to the second-switch transistors T2 connected to the third-switch transistors. Further, the image data are controlled by the second-switch control signal line 12 to be simultaneously or sequentially transmitted to different pixel islands.

As shown in FIG. 6, the display device according to the embodiment of the present disclosure further includes: a gate drive circuit 80 and gate lines 800.

The plurality of gate lines 800 extend in the first direction x and arranged in the second direction y, sub-pixels arranged in the same row in the first direction x being connected to the same gate line 800.

The gate drive circuit 80 is located in the first direction x at one side or two sides of an area where the pixel island 20 is located, the gate lines 800 being connected to the gate drive circuit 80 separately. The gate drive circuit 80 includes a plurality of gate drive units 81 arranged in the second direction y, the gate drive units 81 are cascaded with each other in the second direction y, and the gate drive units 81 independently scan corresponding sub-pixel rows.

Image data in the drive chip 60 need to be written onto the pixel island 20 in cooperation with a scanning signal output by the gate drive circuit 80. When the gate drive circuit 80 transmits the scanning signal to the gate line, a row of sub-pixels may merely write the image data onto the sub-pixels of the row through the data line 40 when the gate line 800 transmits the active level signal. In the embodiment of the present disclosure, by controlling scanning signals of adjacent multi-row sub-pixel islands to be the same, image data of multi-row and multi-column sub-pixel islands may be simultaneously controlled, such that resolution may be adjusted to a greater extent.

It should be noted that the display device according to the embodiment of the present disclosure may be driven by the first multiplexing unit 51 or the second multiplexing unit 52. When the first multiplexing unit 51 is used for driving, the control units c keep turned-on, and the second multiplexing unit 52 has no signal transmission, in this case, the display device may be controlled to switch the number of viewpoints, so as to adjust the display resolution. When the second multiplexing unit 52 is used for driving, the control units c keeps turned-off, and the first multiplexing unit 51 has no signal transmission, in this case, the display device may be controlled to switch the number of viewpoints and the pixel island resolution at the same time, so as to adjust the display resolution.

A circuit connection relation is described with a specific example in embodiments of the present disclosure.

Figure 7:
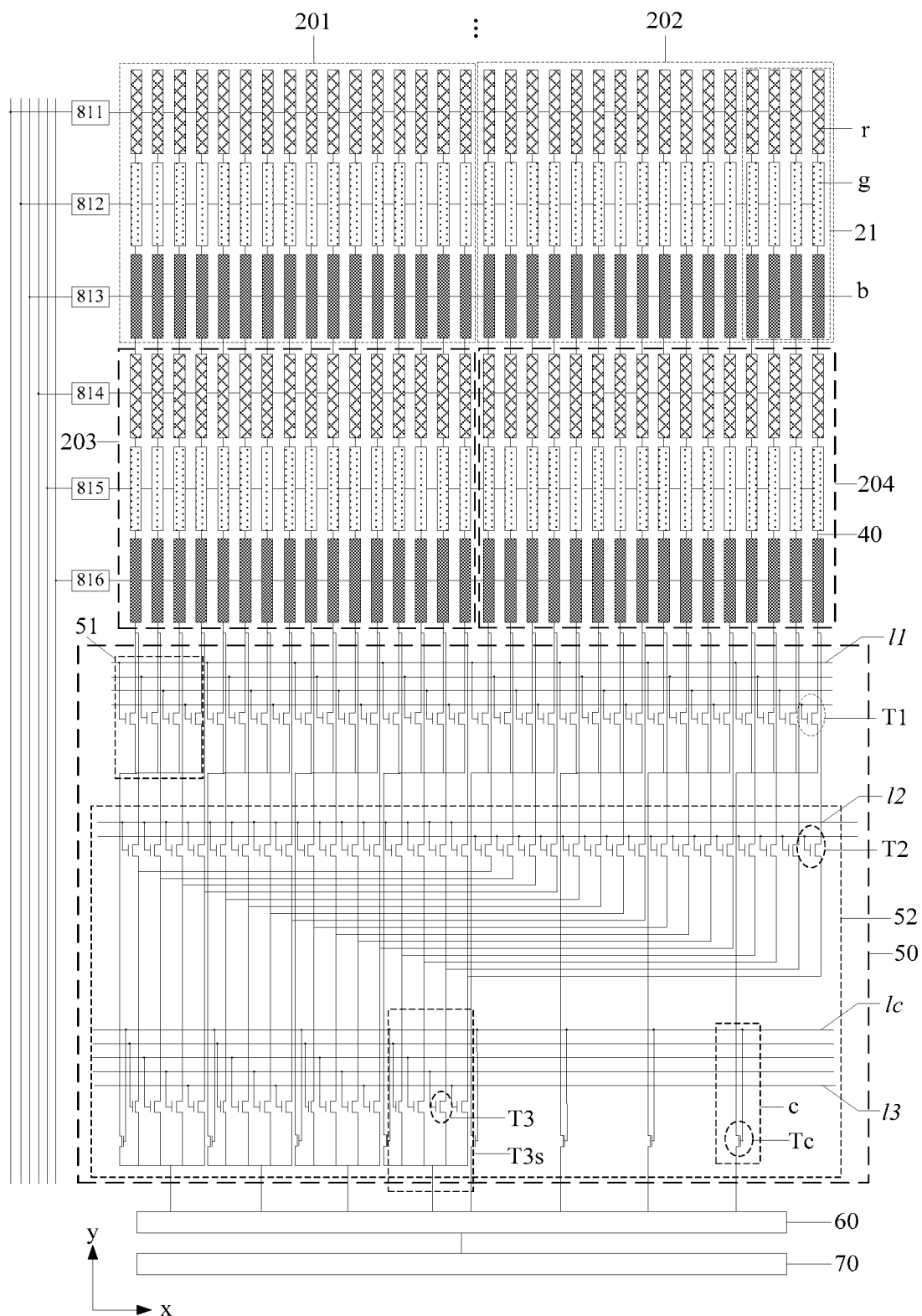
FIG. 7 is a third partial enlarged view of a display device according to an embodiment of the present disclosure.

FIG. 7 is a third partial enlarged view of a display device according to an embodiment of the present disclosure.

FIG. 7 shows a circuit connection relation of four adjacent pixel islands, and the display device includes a plurality of units shown in FIG. 7. Specifically, the display device includes a plurality of pixel islands, each pixel island includes sixteen red sub-pixels r, sixteen green sub-pixels g and sixteen blue sub-pixels b, and the red sub-pixels r, the green sub-pixels g and the blue sub-pixels b are arranged in three rows in the first direction x and sixteen columns in the second direction y. One pixel island is mapped by the microlens layer to form sixteen pixels arranged in four rows and four columns.

Sub-pixels in one pixel island are divided into four sub-pixel groups 21 in the first direction x, and each sub-pixel group 21 includes four sub-pixel columns.

A multiplexing circuit 50 includes a plurality of first multiplexing units 51, and one pixel island corresponds to four first multiplexing units 51.

The multiplexing circuit 50 includes four first-switch control signal lines 11, one first multiplexing unit 51 includes four first-switch transistors T1, control poles of the four first-switch transistors T1 are connected to the four first-switch control signal lines 11 in a one-to-one correspondence mode, first poles of the four first-switch transistors are connected to data lines 40 corresponding to four sub-pixel columns in one sub-pixel group 21, and second poles of the four first-switch transistors T1 are connected to each other.

The multiplexing circuit 50 includes control units c, and one pixel island corresponds to four control units c. One first multiplexing unit 51 is connected to the drive chip 60 through one corresponding control unit c.

The multiplexing circuit 50 includes one control signal line lc, and the control units c each include one control switch transistor Tc; control poles of the control switch transistors Tc are connected to one control signal line lc, a first pole of the control switch transistor Tc in one control unit c is connected to the second poles of the four first-switch transistors T1 in one first multiplexing unit 51, and a second pole of the control switch transistor Tc is connected to the drive chip 60.

The multiplexing circuit 50 includes a plurality of second multiplexing units, one second multiplexing unit 52 is correspondingly connected to two pixel islands arranged in the first direction x, and the two pixel islands are a first pixel island 201 and a second pixel island 202.

The multiplexing circuit 50 includes two second-switch control signal lines l2 and four third-switch control signal lines l3. One second multiplexing unit 52 includes 32 second-switch transistors T2, data lines of the first pixel island 201 are connected to 16 second-switch transistors T2 respectively, and data lines of the second pixel island 202 are connected to the other 16 second-switch transistors T2 respectively. Control poles of 16 second-switch transistors T2 corresponding to the first pixel island 201 are all connected to one second-switch control signal line l2, and control poles of 16 second-switch transistors T2 corresponding to the second pixel island 202 are all connected to the other second-switch control signal line l2. First poles of the second-switch transistors T2 corresponding to the first pixel island 201 are connected to the data lines of the first pixel island 201 in a one-to-one correspondence mode, and first poles of the second-switch transistors T2 corresponding to the second pixel island 202 are connected to the data lines of the second pixel island 202 in a one-to-one correspondence mode. A second pole of a second-switch transistor T2 connected to a first column of sub-pixels of the first pixel island 201 is interconnected to a second pole of a second-switch transistor T2 connected to a first row of sub-pixels of the second pixel island 202, a second pole of a second-switch transistor T2 connected to a second column of sub-pixels of the first pixel island 201 is interconnected to a second pole of a second-switch transistor T2 connected to a second row of sub-pixels of the second pixel island 202, by analogy, a second pole of a second-switch transistor T2 connected to a sixteenth column of sub-pixels of the first pixel island 201 is interconnected to a second pole of a second-switch transistor T2 connected to a sixteenth column of sub-pixels of the second pixel island 202.

One second multiplexing unit 52 includes 16 third-switch transistors T3, the 16 third-switch transistors T3 correspond to the first pixel island 201, and the 16 third-switch transistors T3 are divided into four third-switch transistor groups in the first direction x.

Control poles of 4 third-switch transistors T3 in one third-switch transistor group T3s are connected to the four third-switch control signal lines l2 in a one-to-one correspondence mode, a second pole of a second-switch transistor T2 corresponding to the same sub-pixel column is connected to a first pole of the third-switch transistor T3, and second poles of the 4 third-switch transistors T3 are connected to one another and connected to the drive chip 60.

As shown in FIG. 7, the display device further includes a gate drive circuit located in the first direction x at a side of the pixel island, the gate drive circuit includes a plurality of gate drive units (811-816) cascaded with one another, and each of the gate drive units is connected to a row of sub-pixels through a corresponding gate. When the gate drive units (811-816) output scanning signals to the corresponding gates, in general, active level signals are transmitted in the gates corresponding to the rows of sub-pixels. A first row of sub-pixels may write image data on a corresponding data line onto the sub-pixels during a period when the gate line transmits the active level signal. After the first row of sub-pixels write on the image data, a second row of sub-pixels write image data on a corresponding data line onto the sub-pixels during a period when the gate line transmits the active level signal, and by analogy, one-frame image display may be implemented after image data are written on all the sub-pixels.

In the above display device according to embodiments of the present disclosure, when the first multiplexing unit 51 is used for driving, the control switch transistor Tc is controlled to keep turned-on, and the second multiplexing unit 52 has no signal transmission. In this case, the 4 first-switch transistors T1 in the first multiplexing unit 51 may be controlled to be sequentially turned on, such that image data may be sequentially written onto 4 corresponding columns of sub-pixels. In this case, one pixel island generates a plurality of viewpoints for high-resolution image display. Alternatively, 4 first-switch transistors T1 may be controlled to be simultaneously turned on, such that the same image data may be simultaneously written onto 4 corresponding columns of sub-pixels, and in this case, the number of viewpoints generated by one pixel island may be reduced, and low-resolution image display may be implemented.

When the second multiplexing unit 52 is used for driving, the control switch transistor Tc is controlled to keep turned-off, and the first multiplexing unit 51 has no signal transmission. In this case, by controlling the 16 second-switch transistors T2 corresponding to the first pixel island 201 to be first turned on, image data may be written onto the first pixel island 201, then the 16 second-switch transistors T2 corresponding to the second pixel island 202 may be controlled to be turned on, image data may be written onto the second pixel island 202, and image data written onto different pixel islands may be kept different for high-resolution image display. Alternatively, by controlling the 32 second-switch transistors T2 corresponding to the first pixel island 201 and the second pixel island 202 to be simultaneously turned on, the same image data may be written onto the first pixel island 201 and the second pixel island 202, such that the image resolution may be reduced while the number of viewpoints generated by the pixel islands is kept unchanged, and low-resolution image display is implemented. In this case, it is also possible to control the gate drive units 801 and 804 to transmit the same scanning signal, the gate drive units 802 and 805 to transmit the same scanning signal, and the gate drive units 803 and 806 to transmit the same scanning signal, such that the same image data may be written onto the first pixel island 201, the second pixel island 202, the third pixel island 203 and the fourth pixel island 204, and the image resolution is further reduced.

When the second-switch transistors T2 corresponding to the first pixel island 201 and the second pixel island 202 are controlled to be sequentially or simultaneously turned on, the 4 third-switch transistors T3 in one third-switch transistor group T3s may be controlled to be sequentially turned on, such that image data may be sequentially written onto 4 corresponding columns of sub-pixels. In this case, one pixel island generates a plurality of viewpoints. Alternatively, 4 third-switch transistors T3 may be controlled to be simultaneously turned on, such that the same image data may be simultaneously written onto 4 corresponding columns of sub-pixels, and in this case, the number of viewpoints generated by the pixel island may be reduced.

According to the above display device according to the embodiment of the present disclosure, the image resolution may be adjusted for high-resolution image display in a gaze display area of a user and low-resolution image display in other display areas, thereby reducing power consumption and achieving reasonable allocation of resources on the premise of guaranteeing user experience.

Figure 8:
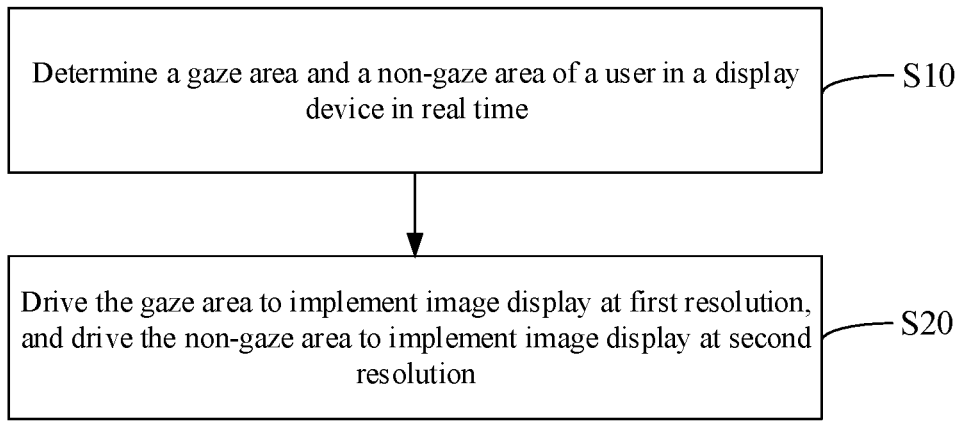
FIG. 8 is a flowchart of a drive method for a display device according to an embodiment of the present disclosure.

Based on a structure of the display device, some embodiments of the present disclosure also provides a drive method for a display device, and FIG. 8 is a flowchart of a drive method for a display device according to the embodiment of the present disclosure.

As shown in FIG. 8, the drive method for a display device according to some embodiments of the present disclosure includes:

S10, in a display device, a gaze area and a non-gaze area of a user are determined in real time;

S20, the gaze area is driven to implement image display at first resolution, and the non-gaze area is driven to implement image display at second resolution.

The first resolution is higher than the second resolution.

According to some embodiments of the present disclosure, the gaze area and the non-gaze area of an image displayed by the display device is determined through a set means, the gaze area is driven to implement image display at the high resolution, and the non-gaze area is driven to implement image display at the low resolution, thereby guaranteeing image display quality of a focused gaze area, reducing the image resolution of the non-gaze area, reducing overall power consumption, and avoiding resource waste.

The above step S10 that in a display device, a gaze area and a non-gaze area of a user are determined in real time includes:

a camera is controlled to photograph eyes of the user in real time;

the gaze area of the user on the display device is determined according to an image shot by the camera; and the remaining area on the display device except the gaze area is determined as the non-gaze area.

During specific implementation, the displayed image of the display device is usually large, and human eyes only gaze at a local area of the displayed image. Therefore, the embodiment of the present disclosure tracks the gaze area of human eyes on the display device in real time by setting the camera on the display device or externally connected to the camera, the gaze area is driven to implement image display at the high resolution, and the non-gaze area is driven to implement image display at the low resolution in real time, thus avoiding the resource waste.

The step that the gaze area of the user on the display device is determined according to an image shot by the camera includes:

positions of a left eye and a right eye of the user relative to a display surface of the display device are determined according to the image shot by the camera;

a left-eye gaze area of the left eye of the user on the display device and a right-eye gaze area of the right eye of the user on the display device are determined respectively according to the positions of the left eye and the right eye of the user relative to the display surface of the display device and a distance between the user and the display device;

an overlap area of the left-eye gaze area and the right-eye gaze area is used as the gaze area of the user on the display device;

a single-eye gaze area of the user on the display device is determined in a formula as follows:

$$S = \pi (A \tan 15°)^2;$$

S represents the single-eye gaze area of the user on the display device, and A represents the distance between the user and the display device.

Figure 9A:
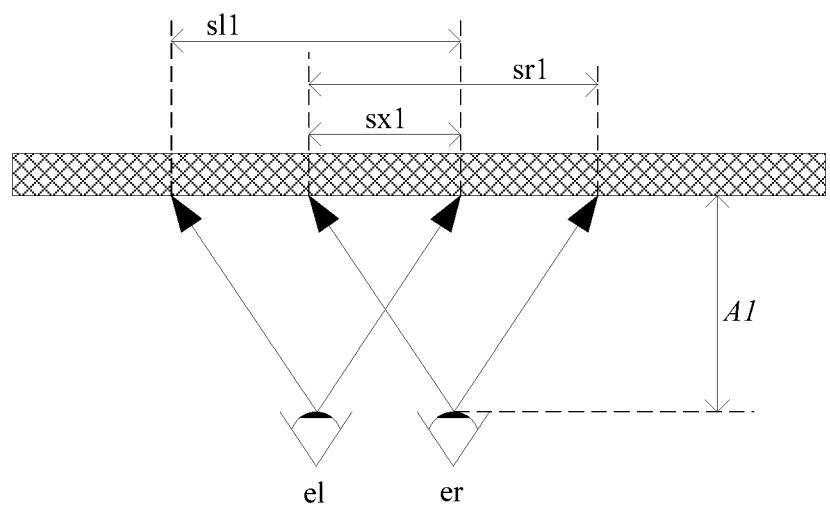
FIG. 9A is a first principle diagram for generating a gaze area by human eyes according to an embodiment of the present disclosure.
Figure 9B:
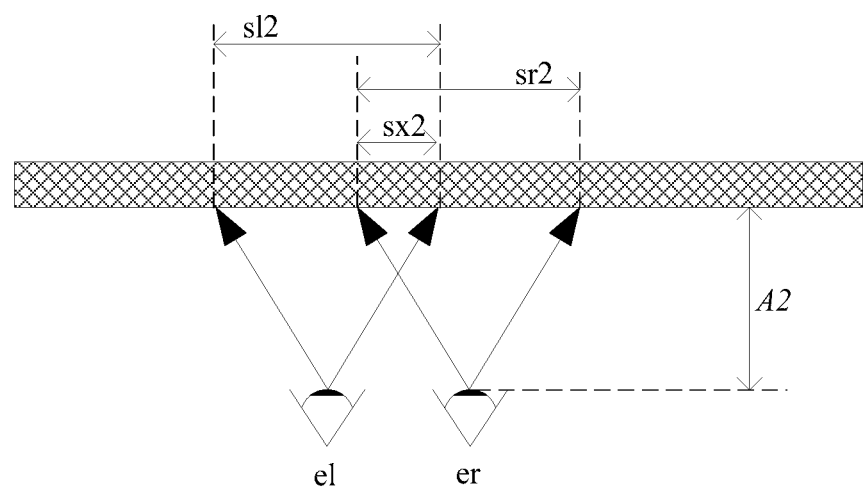
FIG. 9B is a second principle diagram for generating a gaze area by human eyes according to an embodiment of the present disclosure.

FIG. 9A is a first principle diagram for generating a gaze area by human eyes according to an embodiment of the present disclosure, and FIG. 9B is a second principle diagram for generating a gaze area by human eyes according to an embodiment of the present disclosure.

As shown in FIGS. 9A and 9B, human eyes usually have a limited view angle when watching a display device, that is, when positions of human eyes relative to a display surface of the display device are fixed, merely contents within the view angle range may be watched when human eyes gaze at the display device. In general, a view angle generated by one eye is about 30 degrees. As shown in FIG. 9A, when a distance between the eyes of the user and the display device is A1, a left-eye gaze area generated by a left eye on the display device is sl1, and a right-eye gaze area generated by a right eye on the display device is sr1. An overlap area sx1 between the left-eye gaze area and the right-eye gaze area is determined as the gaze area of the eyes of the user on the display device. As shown in FIG. 9B, when a distance between the eyes of the user and the display device is A2, a left-eye gaze area generated by a left eye on the display device is sl2, and a right-eye gaze area generated by a right eye on the display device is sr2. An overlap area sx2 between the left-eye gaze area and the right-eye gaze area is determined as the gaze area of the eyes of the user on the display device. Through comparison between FIG. 9A and FIG. 9B, when the distance from the user to the display device is reduced from A1 to A2, the gaze area generated on the display device is reduced from sx1 to sx2 when computed based on a single-eye view angle of 30 degrees. It may be seen that the gaze area generated by the eyes of the user on the display device depends on the view angle and the distance between the user and the display device. On the premise of a constant view angle, the farther the user is from the display device, the greater the gaze area is.

After the gaze area of the eyes of the user on the display device is determined, the gaze area may be driven to implement high-definition display, while other non-gaze areas are driven to implement low-definition display, thus saving resources.

Figure 10:
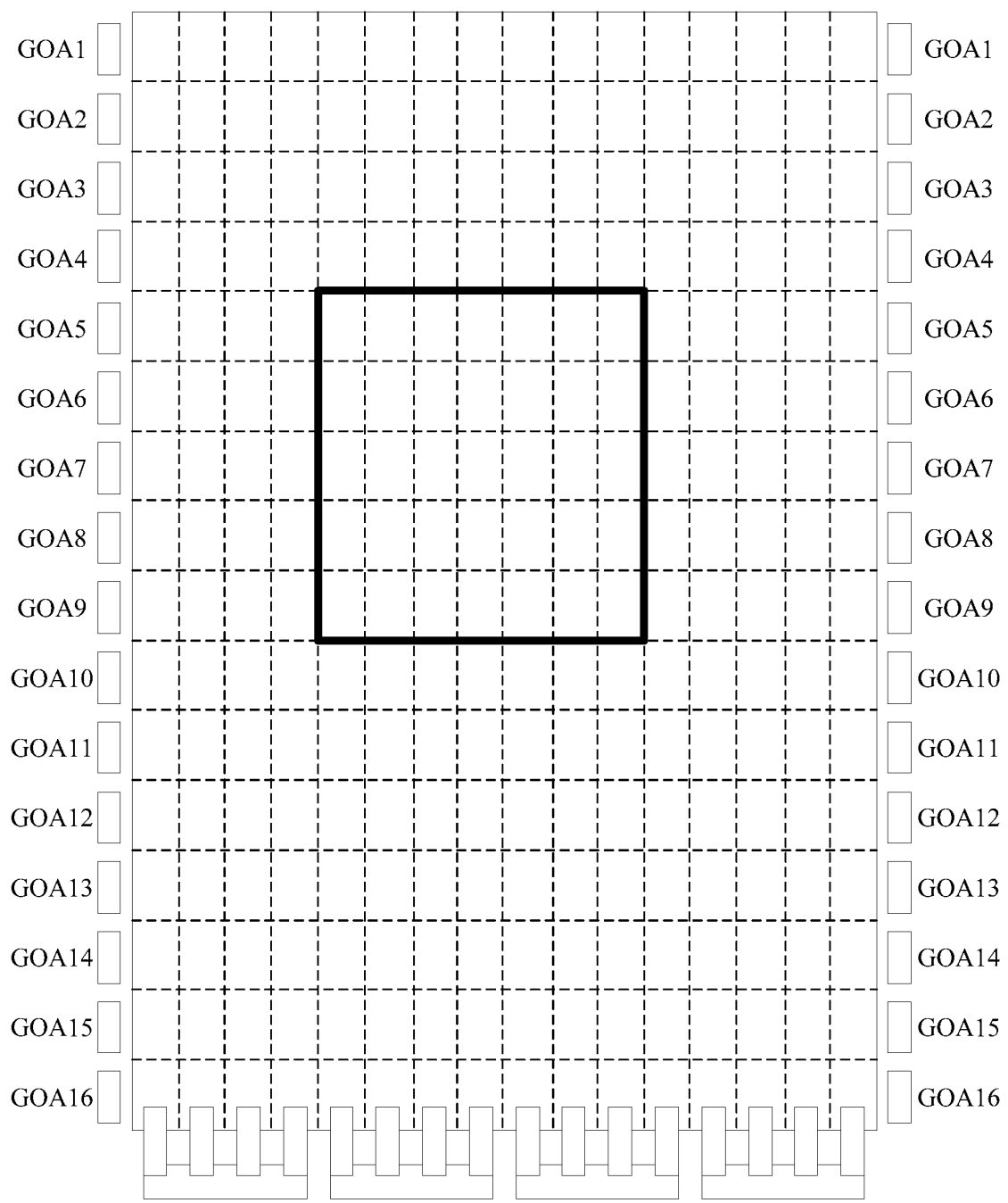
FIG. 10 is a schematic diagram of display partitions of a display device according to an embodiment of the present disclosure.
Figure 11:
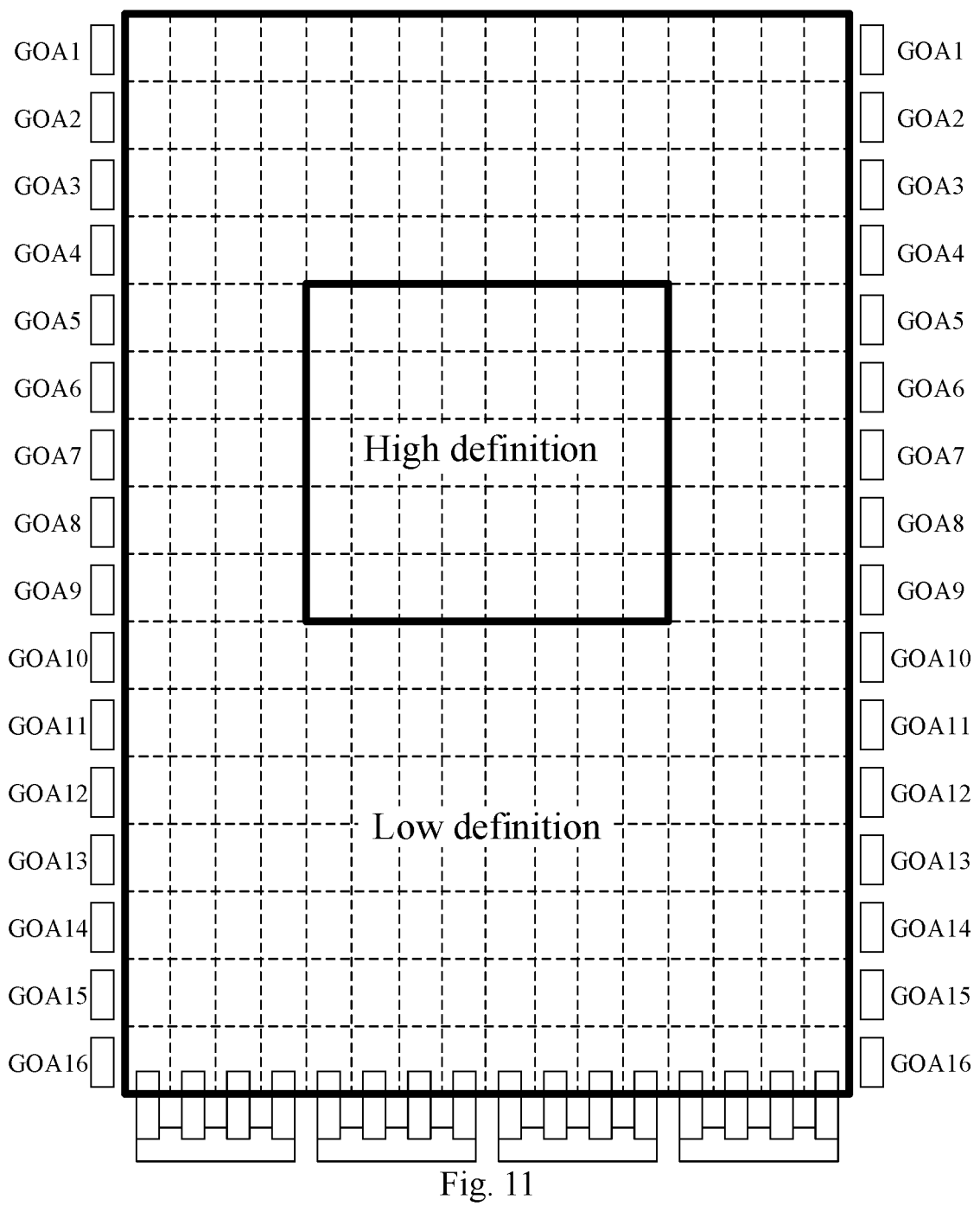
FIG. 11 is a schematic diagram of a display effect of the display device shown in FIG. 10.

FIG. 10 is a schematic diagram of display partitions of a display device according to an embodiment of the present disclosure, and FIG. 11 is a schematic diagram of a display effect of the display device shown in FIG. 10.

As shown in FIG. 10, a display area may be divided into a plurality of areas in an extension direction of a gate drive circuit. In a structure shown in FIG. 10, the embodiment of the present disclosure may divide the display area into 16 partitions, and each of the 16 partitions is independently driven by 16 gate drive units (GOA1-GOA16). If a gaze area of a user on the display device determined by a camera and other devices is an area corresponding to a black box in FIG. 10, the gaze area is driven by the gate drive units GOA5-GOA9. After image data are written onto sub-pixels in the gaze area and a non-gaze area, a display effect is as shown in FIG. 11. The gaze area implements high-definition image display, and the non-gaze area implements low-definition image display, thus saving resources and reducing power consumption. When a gaze position of the user relative to the display device changes, a drive mode of a corresponding area is changed in real time to implement dynamic adjustment of high-definition images and low-definition images.

Before image display, it is necessary to determine a display mode selected by the user. When the user selects a two-dimensional display mode, image data input by the display device are two-dimensional image data, and when the user selects a three-dimensional display mode, image data input by the display device are three-dimensional image data.

In this way, the above step S20 that the gaze area is driven to implement image display at first resolution, and the non-gaze area is driven to implement image display at second resolution specifically includes:

the gaze area is driven to implement two-dimensional image display at the first resolution, and the non-gaze area is driven to implement two-dimensional image display at the second resolution under the condition that the display mode selected by the user is the two-dimensional display mode;

the gaze area is driven to implement three-dimensional image display at the first resolution, and the non-gaze area is driven to implement two-dimensional image display at the second resolution under the condition that the display mode selected by the user is the three-dimensional display mode; and alternatively, the gaze area is driven to implement three-dimensional image display at the first resolution, and the non-gaze area is driven to implement three-dimensional image display at the second resolution under the condition that the display mode selected by the user is the three-dimensional display mode.

When the display mode selected by the user is the two-dimensional display mode, the image data input by the display device are the two-dimensional image data, the displayed image that the user wants to watch is a two-dimensional image, the user merely gazes at part of the display device on the display device, so in this case, the gaze area implements two-dimensional image display at the high resolution, and the non-gaze area implements two-dimensional image display at the low resolution, such that resource waste may be avoided.

When the display mode selected by the user is the three-dimensional display mode, the image data input by the display device are the three-dimensional image data, the displayed image that the user wants to watch is a three-dimensional image, the user merely gazes at part of the display device on the display device, so in this case, the gaze area implements three-dimensional image display at the high resolution, and the non-gaze area implements two-dimensional image display or three-dimensional image display at the low resolution, thus ensuring a desirable display effect of the gaze area, reducing data transmission amount and charging time of the non-gaze area, and reducing power consumption.

In some embodiments, the step that the gaze area is driven to implement two-dimensional image display at the first resolution, and the non-gaze area is driven to implement two-dimensional image display at the second resolution under the condition that the display mode selected by the user is the two-dimensional display mode includes:

two-dimensional image data are received, image rendering is performed on the two-dimensional image data at the first resolution for the gaze area, and image rendering is performed on the two-dimensional image data at the second resolution for the non-gaze area;

first-switch control signal lines corresponding to the gaze area are controlled to sequentially output active level signals, first-switch transistors in a first multiplexing unit are sequentially turned on to transmit different two-dimensional image data, first-switch control signal lines corresponding to the non-gaze area are controlled to simultaneously output active level signals, the first-switch transistors in the first multiplexing unit are simultaneously turned on to transmit the same two-dimensional image data, the gaze area is driven to implement the two-dimensional image display at the first resolution, and the non-gaze area is driven to implement the two-dimensional image display at the second resolution.

The step that the gaze area is driven to implement three-dimensional image display at the first resolution, and the non-gaze area is driven to implement three-dimensional image display at the second resolution under the condition that the display mode selected by the user is the three-dimensional display mode includes:

three-dimensional image data are received, image rendering is performed on the three-dimensional image data at the first resolution for the gaze area, and image rendering is performed on the three-dimensional image data at the second resolution for the non-gaze area.

first-switch control signal lines corresponding to the gaze area are controlled to sequentially output active level signals, first-switch transistors in a first multiplexing unit are sequentially turned on to transmit different three-dimensional image data, first-switch control signal lines corresponding to the non-gaze area are controlled to simultaneously output active level signals, the first-switch transistors in the first multiplexing unit are simultaneously turned on to transmit the same three-dimensional image data, the gaze area is driven to implement the three-dimensional image display at the first resolution, and the non-gaze area is driven to implement the three-dimensional image display at the second resolution.

The step that the gaze area is driven to implement three-dimensional image display at the first resolution, and the non-gaze area is driven to implement two-dimensional image display at the second resolution under the condition that the display mode selected by the user is the three-dimensional display mode includes:

three-dimensional image data are received, and three-dimensional image data corresponding to the non-gaze area are converted into two-dimensional image data;

image rendering is performed on the three-dimensional image data at the first resolution for the gaze area, and image rendering is performed on the two-dimensional image data at the second resolution for the non-gaze area;

first-switch control signal lines corresponding to the gaze area are controlled to sequentially output active level signals, first-switch transistors in a first multiplexing unit are sequentially turned on to transmit different three-dimensional image data, first-switch control signal lines corresponding to the non-gaze area are controlled to simultaneously output active level signals, the first-switch transistors in the first multiplexing unit are simultaneously turned on to transmit the same two-dimensional image data, the gaze area is driven to implement the three-dimensional image display at the first resolution, and the non-gaze area is driven to implement the two-dimensional image display at the second resolution.

Figure 12A:
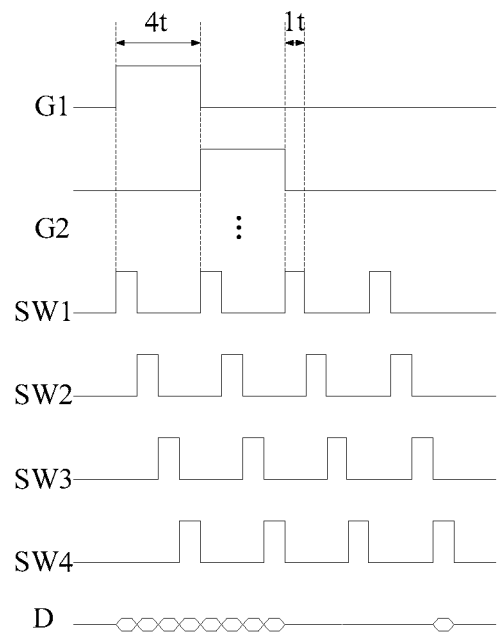
FIG. 12A is a first drive sequence diagram corresponding to a gaze area according to an embodiment of the present disclosure.
Figure 12B:
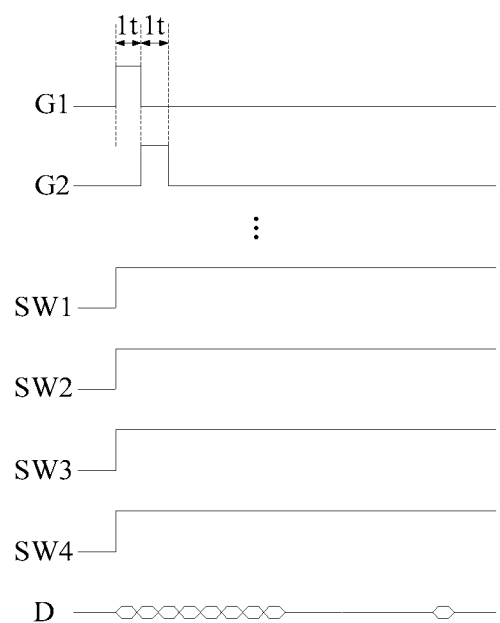
FIG. 12B is a first drive sequence diagram corresponding to a non-gaze area according to an embodiment of the present disclosure.

The embodiment of the present disclosure may implement the above image display through drive by the first multiplexing unit, and a specific driving circuit may use the structure shown in FIG. 4. FIG. 12A is a first drive sequence diagram corresponding to a gaze area according to an embodiment of the present disclosure, and FIG. 12B is a first drive sequence diagram corresponding to a non-gaze area according to an embodiment of the present disclosure.

As shown in FIG. 4, each pixel island is connected to four first multiplexing units 51, each first multiplexing unit 51 includes four first-switch transistors T1, and a multiplexing circuit includes four first-switch control signal lines l1, and switch control signals output by the four first-switch control signal lines are SW1-SW4 shown in FIG. 12A respectively. Scanning signals transmitted by corresponding gates of rows of sub-pixels are G1, G2 . . . as shown in FIG. 12A, respectively, and image data output by the drive chip are D as shown in FIG. 12A.

As shown in FIG. 12A, for the first multiplexing units 51 in the gaze area, the four first-switch control signal lines l1 sequentially output active level signals (high-level signals), such that the corresponding four first-switch transistors T1 are sequentially turned on to output different image data to columns of sub-pixels of the pixel island.

In some embodiments, during the period (high level period) when a first gate line outputs a scanning signal G1 at an active level, other gate lines output scanning signals at a low level. During the period when the first gate line outputs the active level, a first first-switch control signal line first outputs a high-level signal (SW1 is at a high level), and the other three first-switch control signal lines all output low-level signals (SW2-SW41 are at a low level). In this case, merely first-switch transistors connected to the first first-switch control signal line are turned on, and the image data output by the drive chip are transmitted to a first row of sub-pixels of the pixel island through a first first-switch transistor. Then a second first-switch control signal line outputs a high-level signal (SW2 is at a high level), and the other three first-switch control signal lines all output low-level signals (SW1, SW3 and SW4 are at a low level). In this case, merely first-switch transistors connected to a second first-switch control signal line are turned on, and the image data output by the drive chip are transmitted to a second column of sub-pixels of the pixel island through a second first-switch transistor. Then a third first-switch control signal line outputs a high-level signal (SW3 is at a high level), and the other three first-switch control signal lines all output low-level signals (SW1, SW2 and SW4 are at a low level). In this case, merely first-switch transistors connected to a third first-switch control signal line are turned on, and the image data output by the drive chip are transmitted to a third column of sub-pixels of the pixel island through a third first-switch transistor. Then a fourth first-switch control signal line outputs a high-level signal (SW4 is at a high level), and the other three first-switch control signal lines all output low-level signals (SW1-SW3 are at a low level). In this case, merely first-switch transistors connected to a fourth first-switch control signal line are turned on, and the image data output by the drive chip are transmitted to a fourth column of sub-pixels of the pixel island through a fourth first-switch transistor. After transmission of the above image data is completed, the period when the first gate line outputs the scanning signal G1 at the active level ends, a scanning signal G2 output by a second gate line becomes a signal at an active level (high level). The first multiplexing units repeat the above operation, and by analogy, the image data are sequentially written onto the sub-pixels in the gaze area, thus implementing high-resolution image display in the gaze area.

As shown in FIG. 12B, for the first multiplexing units 51 in the non-gaze area, the four first-switch control signal lines l1 simultaneously output active level signals (high-level signals), such that the corresponding four first-switch transistors T1 are simultaneously turned on to output the same image data to columns of sub-pixels of the pixel island.

In some embodiments, during the period (high level period) when a first gate line outputs a scanning signal G1 at an active level, other gate lines output scanning signals at a low level. During the period when the first gate line outputs the active level, the four first-switch control signal lines simultaneously output high-level signals (SW1-SW4 are at a high level). In this case, the four first-switch transistors connected to the four first-switch control signal lines are simultaneously turned on, and the image data output by the drive chip are simultaneously transmitted to four columns of sub-pixels of the pixel island through the four first-switch transistors. After transmission of the above image data is completed, the period when the first gate line outputs the scanning signal G1 at the active level ends, a scanning signal G2 output by a second gate line becomes a signal at an active level (high level). The first multiplexing units repeat the above operation, and by analogy, the same image data are simultaneously written onto the four columns of the sub-pixels in the non-gaze area, thus reducing image resolution by 4 times, and implementing low-resolution image display in the non-gaze area.

When the display mode selected by the user is a two-dimensional display mode, the image data transmitted by the drive chip through the first multiplexing units are two-dimensional image data, the gaze area and the non-gaze area implement two-dimensional image display, and image resolution of the gaze area is greater than image resolution of the non-gaze area. When the display mode selected by the user is the three-dimensional display mode, the gaze area and the non-gaze area may implement three-dimensional image display, or the gaze area may implement three-dimensional image display, and the non-gaze area may implement two-dimensional image display. In view of the above two cases, the drive chip transmits, through the first multiplexing units, three-dimensional image data to the gaze area and transmits three-dimensional image data or two-dimensional image data to the non-gaze area. However, an image source input by a controller are three-dimensional image data or two-dimensional image data, so when the gaze area implements three-dimensional image display and the non-gaze area implements two-dimensional image display, it is necessary to convert the three-dimensional image data in the non-gaze area into two-dimensional image data and then transmit the two-dimensional image data to the first multiplexing units corresponding to the non-gaze area. In addition, before the controller outputs the image data to the drive chip, the image data will be subjected to image rendering accordingly. Reference may be made to the prior art for the rules of image rendering, which will not be repeated herein.

Figure 13A:
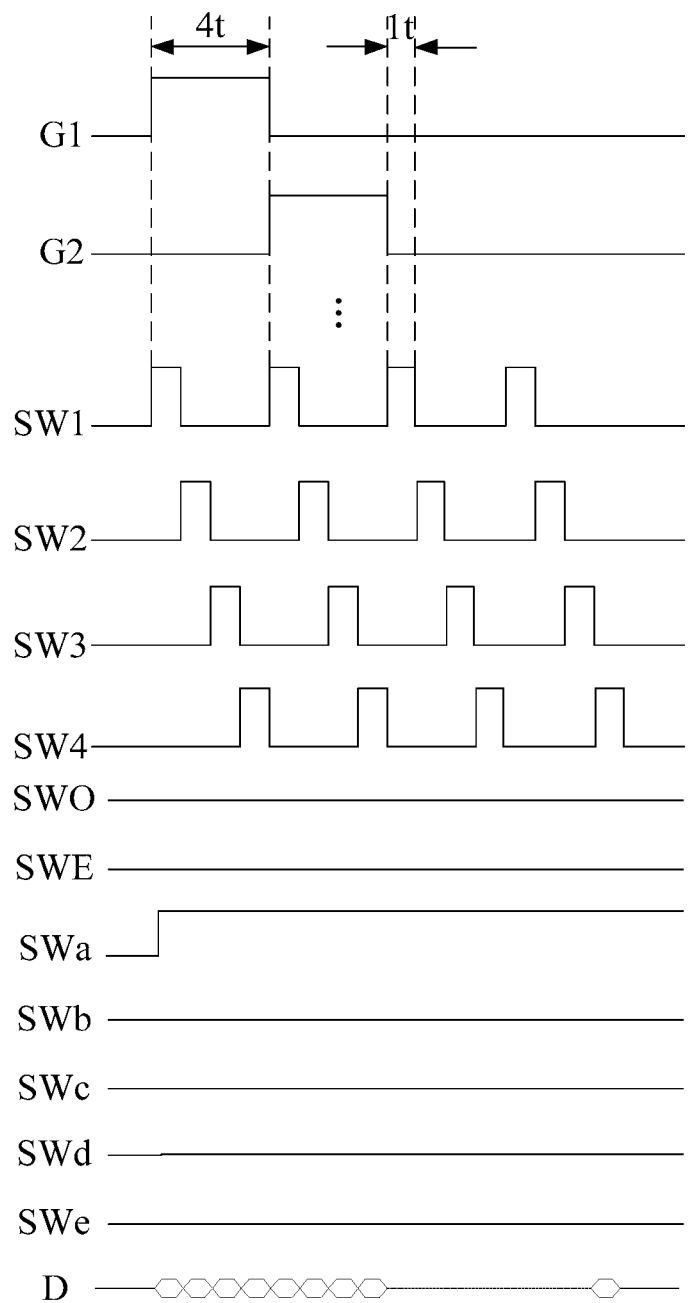
FIG. 13A is a second drive sequence diagram corresponding to a gaze area according to an embodiment of the present disclosure.

The display device according to the embodiment of the present disclosure may simultaneously include a first multiplexing unit and a second multiplexing unit, and the embodiment of the present disclosure may also implement the above image display under drive through cooperation of the first multiplexing unit with the second multiplexing unit, and a specific drive circuit may use a structure shown in FIG. 5. FIG. 13A is a second drive sequence diagram corresponding to a gaze area according to an embodiment of the present disclosure, and FIG. 13B is a second drive sequence diagram corresponding to a non-gaze area according to an embodiment of the present disclosure.

As shown in FIG. 5, each pixel island is connected to four first multiplexing units 51, and every two pixel islands are connected to one second multiplexing unit 52. Each first multiplexing unit 51 includes four first-switch transistors T1, and a multiplexing circuit includes four first-switch control signal lines l1, and switch control signals output by the four first-switch control signal lines l1 are SW1-SW4 shown in FIG. 13A respectively. Each second multiplexing unit 52 includes 32 second-switch transistors T2, 16 third-switch transistors T3 and one control switch transistor Tc. The multiplexing unit includes two second-switch control signal lines l2, four third-switch control signal lines l3 and one control signal line lc. Switch control signals output by two second-switch control signal lines l2 are SWO-SWE respectively as shown in FIG. 13A, switch control signals output by the four third-switch control signal lines l3 are SWb-SWe respectively as shown in FIG. 13A, and switch control signal output by the control signal line lc is SWa as shown in FIG. 13A. Scanning signals transmitted by corresponding gates of rows of sub-pixels are G1, G2 . . . as shown in FIG. 13A, respectively, and image data output by the drive chip are D as shown in FIG. 13A.

Figure 13B:
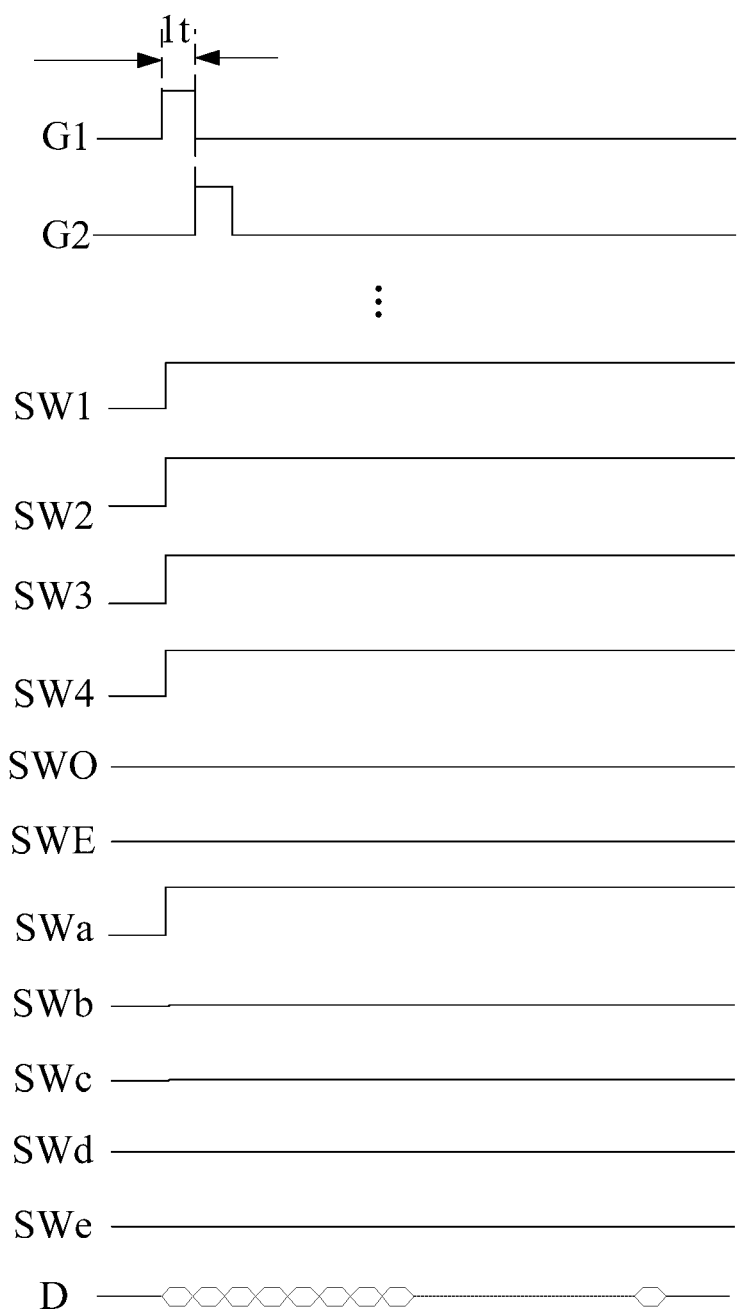
FIG. 13B is a second drive sequence diagram corresponding to a non-gaze area according to an embodiment of the present disclosure.

As shown in FIGS. 13A and 13B, the control signal line lc may output an active level signal (high-level signal), and the second-switch control signal lines l2 and the third-switch control signal line l3 may output low-level signals, such that the second multiplexing unit 52 is turned off, and the first multiplexing unit is used for driving.

As shown in FIG. 13A, for the gaze area, the four first-switch control signal lines l1 sequentially output active level signals (high-level signals), such that the corresponding four first-switch transistors T1 are sequentially turned on to output different image data to columns of sub-pixels of the pixel island.

In some embodiments, during the period (high level period) when a first gate line outputs a scanning signal G1 at an active level, other gate lines output scanning signals at a low level. During the period when the first gate line outputs the active level, a first first-switch control signal line first outputs a high-level signal (SW1 is at a high level), and the other three first-switch control signal lines all output low-level signals (SW2-SW41 are at a low level). In this case, merely first-switch transistors connected to the first first-switch control signal line are turned on, and the image data output by the drive chip are transmitted to a first row of sub-pixels of the pixel island through a first first-switch transistor. Then a second first-switch control signal line outputs a high-level signal (SW2 is at a high level), and the other three first-switch control signal lines all output low-level signals (SW1, SW3 and SW4 are at a low level). In this case, merely first-switch transistors connected to a second first-switch control signal line are turned on, and the image data output by the drive chip are transmitted to a second column of sub-pixels of the pixel island through a second first-switch transistor. Then a third first-switch control signal line outputs a high-level signal (SW3 is at a high level), and the other three first-switch control signal lines all output low-level signals (SW1, SW2 and SW4 are at a low level). In this case, merely first-switch transistors connected to a third first-switch control signal line are turned on, and the image data output by the drive chip are transmitted to a third column of sub-pixels of the pixel island through a third first-switch transistor. Then a fourth first-switch control signal line outputs a high-level signal (SW4 is at a high level), and the other three first-switch control signal lines all output low-level signals (SW1-SW3 are at a low level). In this case, merely first-switch transistors connected to a fourth first-switch control signal line are turned on, and the image data output by the drive chip are transmitted to a fourth column of sub-pixels of the pixel island through a fourth first-switch transistor. After transmission of the above image data is completed, the period when the first gate line outputs the scanning signal G1 at the active level ends, a scanning signal G2 output by a second gate line becomes a signal at an active level (high level). The first multiplexing units repeat the above operation, and by analogy, the image data are sequentially written onto the sub-pixels in the gaze area, thus implementing high-resolution image display in the gaze area.

As shown in FIG. 13B, for the non-gaze area, the four first-switch control signal lines l1 simultaneously output active level signals (high-level signals), such that the corresponding four first-switch transistors T1 are simultaneously turned on to output the same image data to columns of sub-pixels of the pixel island.

In some embodiments, during the period (high level period) when a first gate line outputs a scanning signal G1 at an active level, other gate lines output scanning signals at a low level. During the period when the first gate line outputs the active level, the four first-switch control signal lines simultaneously output high-level signals (SW1-SW4 are at a high level). In this case, the four first-switch transistors connected to the four first-switch control signal lines are simultaneously turned on, and the image data output by the drive chip are simultaneously transmitted to four columns of sub-pixels of the pixel island through the four first-switch transistors. After transmission of the above image data is completed, the period when the first gate line outputs the scanning signal G1 at the active level ends, a scanning signal G2 output by a second gate line becomes a signal at an active level (high level). The first multiplexing units repeat the above operation, and by analogy, the same image data are simultaneously written onto the four columns of the sub-pixels in the non-gaze area, thus reducing image resolution by 4 times, and implementing low-resolution image display in the non-gaze area.

Through comparison between FIG. 12A and FIG. 12B, and comparison between FIG. 13A and FIG. 13B, it may be seen that charging time of columns of sub-pixels is 1t, and when four first-switch transistors T1 in one first multiplexing unit 51 are sequentially turned on to charge four columns of sub-pixels respectively, required time is 4t. When four first-switch transistors in one first multiplexing unit 51 are simultaneously turned on to charge four columns of sub-pixels, required time is 1t. It may be seen that charging time of the sub-pixel of the non-gaze area is ¼ of charging time of the sub-pixel of the gaze area, such that scanning duration of the gate drive unit corresponding to the gaze area will be longer than scanning duration of the gate drive unit corresponding to the non-gaze area. Specifically, duration of an active level output by the gate drive unit corresponding to the non-gaze area may be shortened to ¼ of duration of an active level output by the gate drive unit corresponding to the gaze area, and the number of turn-on times of the first multiplexing unit in the non-gaze area is reduced by ¾ compared with the number of turn-on times of the first multiplexing unit in the gaze area, and power consumption is reduced to ¼ of the original power consumption. Since the charging time of the non-gaze area is shortened, saved time may be used to improve a refresh rate of the displayed image, or may also be used to increase a refresh rate of the gaze area, thus improving a display effect.

For example, if the display device includes 2000 rows of sub-pixels, the gaze area includes 1000 rows of sub-pixels and the non-gaze area includes 1000 rows of sub-pixels. The charging time of each sub-pixel is t. Then if the sub-pixels are sequentially charged according to a traditional drive method, charging time required is 2000*4*t=8000t. However, by using the above drive solution according to the embodiment of the present disclosure, for the gaze area, it takes 1000*1*t to control the columns of sub-pixels to be sequentially charged, and for the non-gaze area, it takes 1000*4*t to control a plurality of columns of sub-pixels to be simultaneously charged, and total charging time is 1000*1*t+1000*4*t=5000t. It may be seen that the drive solution according to the embodiment of the present disclosure may shorten the total charging time, the saved time may be used to improve a refresh frequency of the display device, and a total refresh frequency may be improved to 8/5 times according to the above example.

By driving the display device based on the drive solution shown in FIG. 13A, 4K image data may generate 16 viewpoints and also implement an image refresh rate of 20 Hz. By driving the display device based on the drive solution shown in FIG. 13B, 4K image data may generate 4 viewpoints, and also implement an image refresh rate of 80 Hz. It may be seen that when the number of viewpoints is reduced (image resolution is reduced), saved time may be used to improve the image refresh rate.

Figure 14:
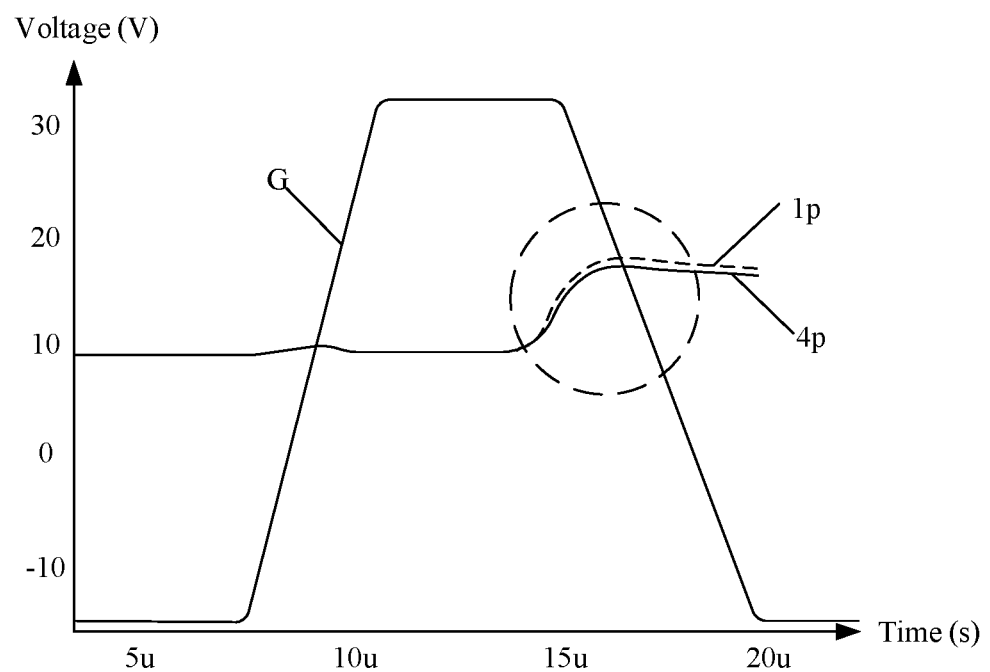
FIG. 14 is a comparison diagram of charging voltages of a gaze area and a non-gaze area according to embodiment of the present disclosure.

FIG. 14 is a comparison diagram of charging voltages of a gaze area and a non-gaze area according to embodiment of the present disclosure.

As shown in FIG. 14, a period when the gate drive unit outputs the scanning signal G at the active level ends, then charging action of the sub-pixels ends. However, according to the embodiment of the present disclosure, the plurality of columns of sub-pixels in the non-gaze area are simultaneously charged, it may be seen from FIG. 14 that a charging voltage ($4p$) after the four column of sub-pixels are simultaneously charged is lower than a charging voltage ($1p$) after the columns of sub-pixels are sequentially charged since a load generated when the four columns of sub-pixels are simultaneously charged is greater. In this case, if the same drive current is used to simultaneously drive the four columns of sub-pixels to be charged, undercharge of the four columns of sub-pixels may be caused, that is, when the same drive current is used to charge the sub-pixels in the gaze area and the non-gaze area, uneven picture display may be caused due to undercharge of the non-gaze area.

According to embodiments of the present disclosure, in order to overcome the above problems, the drive current of the drive chip is adjusted, and the drive current of the drive chip for the non-gaze area is increased, such that a difference of charging degrees of the sub-pixels in the gaze area and the non-gaze area is less than a set threshold. The set threshold may be set to a small value, such that the charging degrees of the sub-pixels in the gaze area and the non-gaze area tend to be equal. For example, after the gaze area and the non-gaze area are determined, a drive current of the gaze area may be adjusted to 60%-80% of the original drive current, and the drive current of the non-gaze area may be adjusted to 100%-120% of the original drive current to drive the display device, such that the sub-pixels in the gaze area and the non-gaze area may be fully charged, and uneven picture display may be avoided.

In some embodiments, the controller may send a control instruction to a register connected to a bias circuit of the drive chip according to the China high-speed point-to-point interface (CHPI) protocol, such that the drive chip may distinguish the gaze area from the non-gaze area and drive the gaze area and the non-gaze area respectively by using drive currents stored in the register.

Figure 15A:
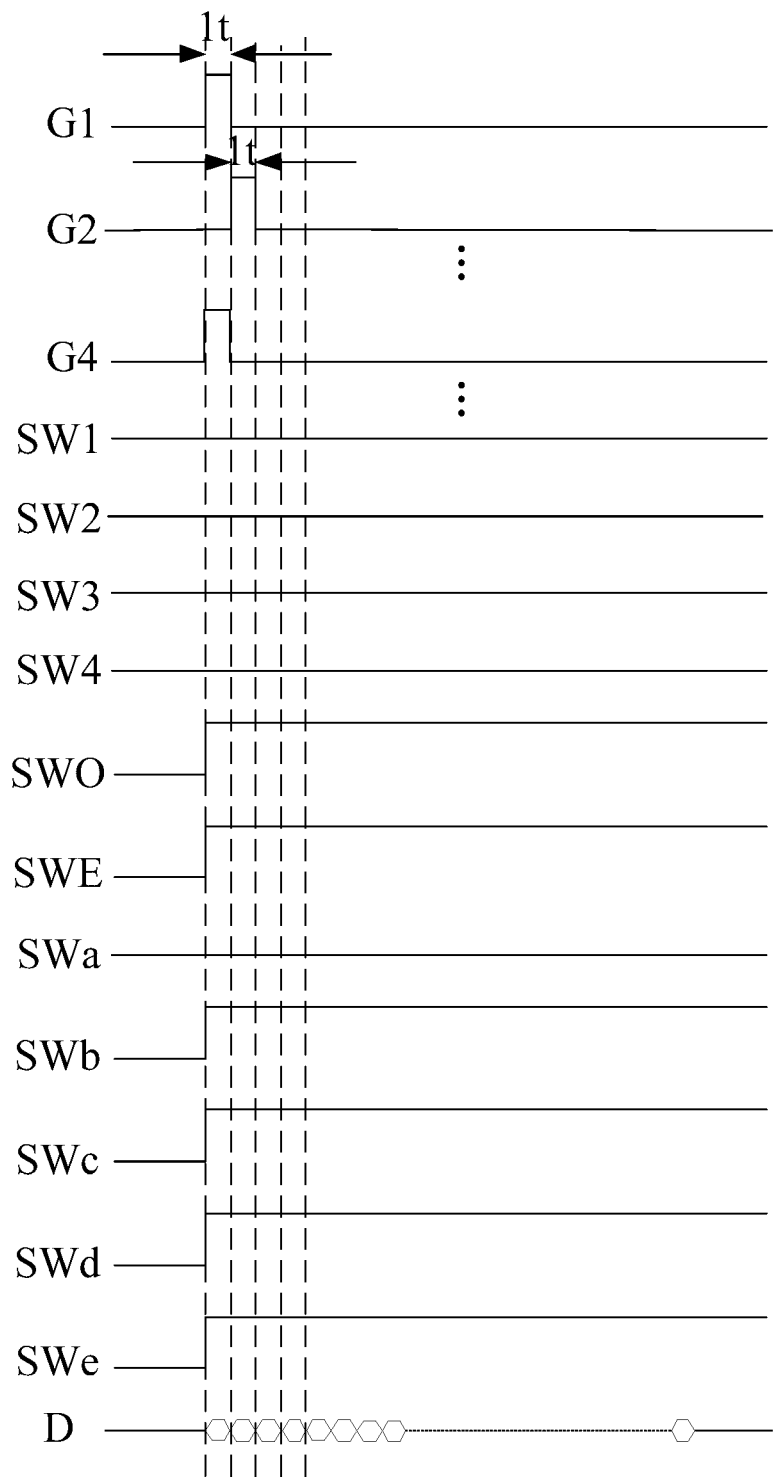
FIG. 15A is a third drive sequence diagram corresponding to a gaze area according to an embodiment of the present disclosure.

The display device according to the embodiment of the present disclosure may also be driven by the second multiplexing unit 52. A specific drive circuit may use a structure shown in 7. FIG. 15A is a third drive sequence diagram corresponding to a gaze area according to an embodiment of the present disclosure, and FIG. 15B is a third drive sequence diagram corresponding to a non-gaze area according to an embodiment of the present disclosure.

As shown in FIG. 7, the gate drive circuit of the display device includes a plurality of gate drive units (811-816), and the gate drive units output scanning signals to corresponding sub-pixel rows. Connection relations between each pixel island and the first multiplexing unit 51 and between each pixel island the second multiplexing unit 52 are the same as a connection relation in FIG. 5, and will not be repeated herein.

Figure 15B:
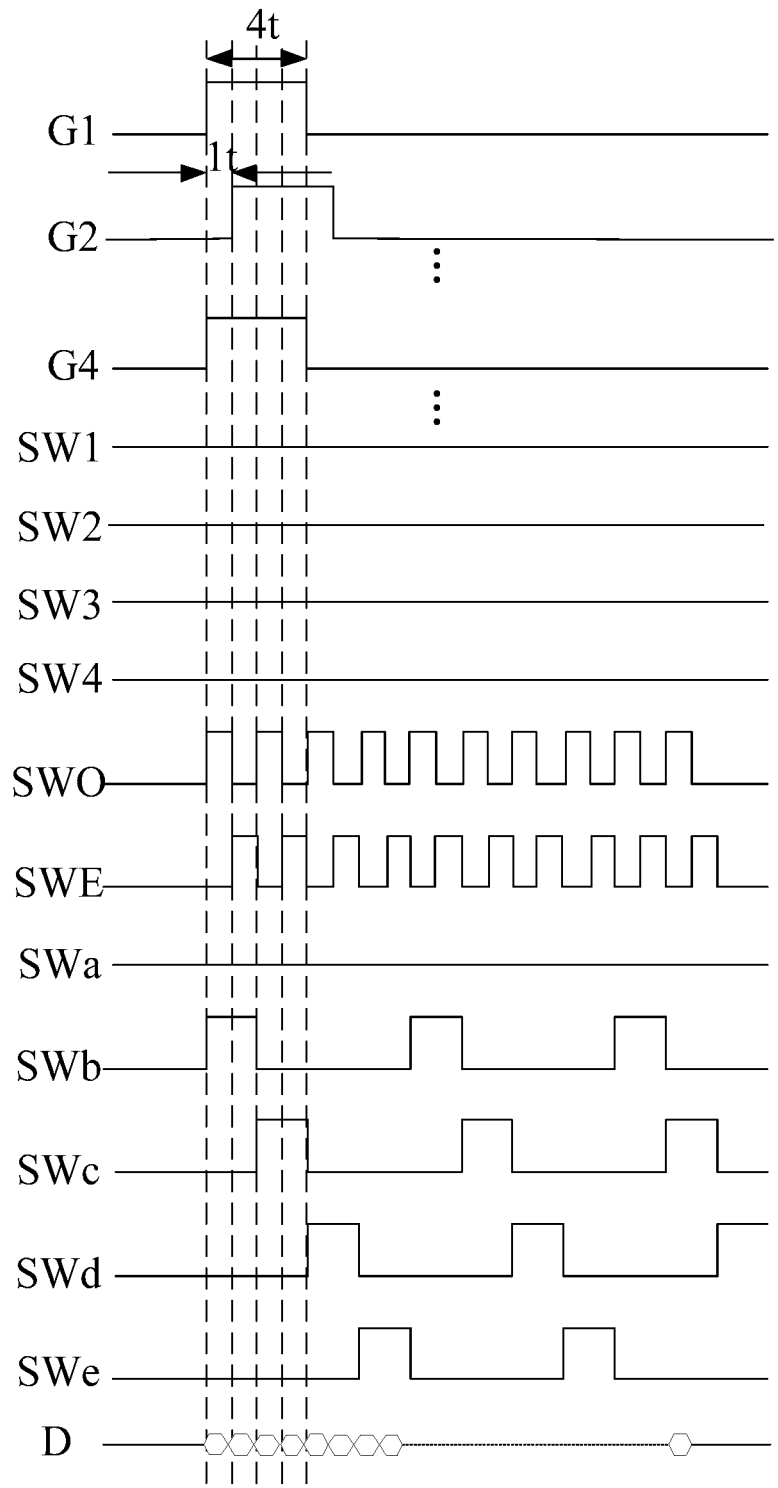
FIG. 15B is a third drive sequence diagram corresponding to a non-gaze area according to an embodiment of the present disclosure.

As shown in FIGS. 15A and 15B, when the display device is driven with the second multiplexing unit 52, the control signal line always outputs a low-level signal (SWa), such that the control switch transistor Tc keeps turned-off, and in this case, the signal may not be transmitted to the first multiplexing unit 51, and transmission of image data is controlled by the second multiplexing unit 52. Driving the display device with the second multiplexing unit 52 may not only sequentially transmit the image data to a plurality of pixel islands, but also simultaneously transmit the same image data to a plurality of pixel islands.

As shown in FIG. 15A, when a plurality of adjacent pixel islands 20 are driven to load the same image data, second-switch control signal lines are controlled to simultaneously output active level signals (SWO and SWE are high-level signals), such that second-switch transistors T2 in the second multiplexing unit are simultaneously turned on. In this case, an output signal of a gate drive unit connected to an $n^{th}$ row of sub-pixels and an output signal of a gate drive unit connected to an $n+3^{th}$ row of sub-pixels are controlled to be the same, where n is an integer greater than or equal to 1.

In some embodiments, when four adjacent pixel islands 20 in two rows and two columns are driven to load the same image data, in the case that during a period (high level period) when a first gate line outputs a scanning signal G1 at an active level, a scanning signal G4 output by a fourth gate line is the same as G1, and other gate lines output scanning signals at a low level. The gate lines keep at an active level for 1t.

During a period when a first gate line and the fourth gate line output active-level signals, the two second-switch control signal lines output high-level signals (SWO and SWE are at a high level), and in this case, all the 32 second-switch transistors T2 of the four pixel islands are controlled to be turned on. Image data may be simultaneously transmitted to the four pixel islands, and the image data loaded by the four pixel islands are the same, so the four pixel islands may be used as one large pixel island, thus reducing overall resolution. The above drive method may be applied to low-resolution image display in the non-gaze area.

In addition, as shown in FIG. 15A, four third-switch control signal lines may be controlled to output high-level signals (SWb-SWe are at a high level). In this case, four third-switch transistors T3 in each third-switch transistor group T3s are simultaneously turned on, and, the same data signals are simultaneously transmitted to four columns of sub-pixels in each pixel island, such that the number of viewpoints generated in the pixel island may be further reduced, that is, the resolution in the pixel island may be reduced. The above drive method may be applied to low-resolution image display in the non-gaze area.

After transmission of the above image data is completed, the period when the first gate line outputs the scanning signal G1 at the active level ends, a scanning signal G2 output by a second gate line becomes a signal at an active level (high level). A scanning signal G5 output by a fifth gate line is the same to G2, the second multiplexing units repeat the above operation, and by analogy, low-resolution image display in the non-gaze area is implemented.

As shown in FIG. 15B, under the condition that pixel islands are driven to load different image data, the second-switch control signal lines are controlled to sequentially output active level signals (high-level signals), such that second-switch transistors connected to different pixel islands in the second multiplexing unit are sequentially turned on, to transmit different image data.

In some embodiments, during the period (high level period) when a first gate line outputs scanning signal G1 at an active level, a scanning signal G4 output by the fourth gate line is the same as G1, a period when the second gate line outputs a scanning signal G2 at an active level is staggered behind by 1t relative to that of G1, and the scanning signal output by the fifth gate line is the same as G2, and by analogy, duration for each gate line at a high level is duration required for sequentially charging four columns of sub-pixels (duration for keeping at a high level is 4t).

During the period when the first gate line outputs an active level, the signal output by the fourth gate line is the same as the signal of the first gate line, and the two second-switch control signal lines sequentially output active level signals, that is, the first second-switch control signal line outputs a high-level signal (SWO is at a high level) at first, the second second-switch control signal line outputs a low-level signal (SWE is at a low level). Then the second second-switch control signal line outputs an active level signal (SWE is a high-level signal), and the first second-switch control signal line outputs a low-level signal (SWO is a low-level signal). Duration for each second-switch control signal line outputting the active level is duration required for charging a column of sub-pixels (the active level duration is 1t). In this case, when the 16 second-switch transistors T2 connected to the first pixel island are controlled by the first second-switch control signal line to be turned on, the 16 second-switch transistors T2 connected to the second pixel island are controlled by the second second-switch control signal line to be turned off. When the 16 second-switch transistors T2 connected to the second pixel island are controlled by the second second-switch control signal line to be turned on, the 16 second-switch transistors T2 connected to the first pixel island are controlled by the first second-switch control signal line to be turned off, thereby sequentially loading image data to the pixel islands.

As shown in FIG. 15B, when the second-switch transistors T2 are driven as described above, four third-switch control signal lines sequentially output active level signals (high-level signals), and each third-switch control signal line keeps the high-level signal for 2t.

When a first third-switch control signal line outputs an active level signal (SWb is at a high level), the other three third-switch control signal lines all output low-level signals (SWc-SW4e are at a low level). In this case, merely a third-switch transistor connected to the first third-switch control signal line is turned on, the image data output by the drive chip are transmitted to a first column of sub-pixels of the first pixel island through a first third-switch transistor, and then the image data output by the drive chip are transmitted to a first column of sub-pixels of the second pixel island through the first third-switch transistor. Then, a second third-switch control signal line outputs a high-level signal (SWc is at a high level), the other three third-switch control signal lines all output low-level signals (SWb, SWd and SWe are at a low level). In this case, merely a third-switch transistor connected to the second third-switch control signal line is turned on, the image data output by the drive chip are transmitted to a second column of sub-pixels of the first pixel island through a second third-switch transistor, and then the image data output by the drive chip are transmitted to a second column of sub-pixels of the second pixel island through the second third-switch transistor. Then, a third third-switch control signal line outputs a high-level signal (SWd is at a high level), the other three third-switch control signal lines all output low-level signals (SWb, SWc and SWe are at a low level). In this case, merely a third-switch transistor connected to the third third-switch control signal line is turned on, the image data output by the drive chip are transmitted to a third column of sub-pixels of the first pixel island through a third third-switch transistor, and then the image data output by the drive chip are transmitted to a third column of sub-pixels of the second pixel island through the third third-switch transistor. Then, a fourth third-switch control signal line outputs a high-level signal (SWe is at a high level), the other three third-switch control signal lines all output low-level signals (SWb-SWd are at a low level). In this case, merely a third-switch transistor connected to the fourth third-switch control signal line is turned on, the image data output by the drive chip are transmitted to a fourth column of sub-pixels of the first pixel island through a fourth third-switch transistor, and then the image data output by the drive chip are transmitted to a fourth column of sub-pixels of the second pixel island through the fourth third-switch transistor. Therefore, different image data are sequentially loaded onto the sub-pixels of different pixel islands, and the drive method may be used for driving the gaze area to implement high-definition image display.

By driving the display device based on the drive solution shown in FIG. 15A, 2K image data may generate 4 viewpoints and also implement an image refresh rate of 80 Hz. By driving the display device based on the drive solution shown in FIG. 15B, 2K image data may generate 16 viewpoints, and also implement an image refresh rate of 80 Hz. It may be seen that the number of viewpoints may also be adjusted by controlling the plurality of pixel islands to be simultaneously charged.

Figure 16:
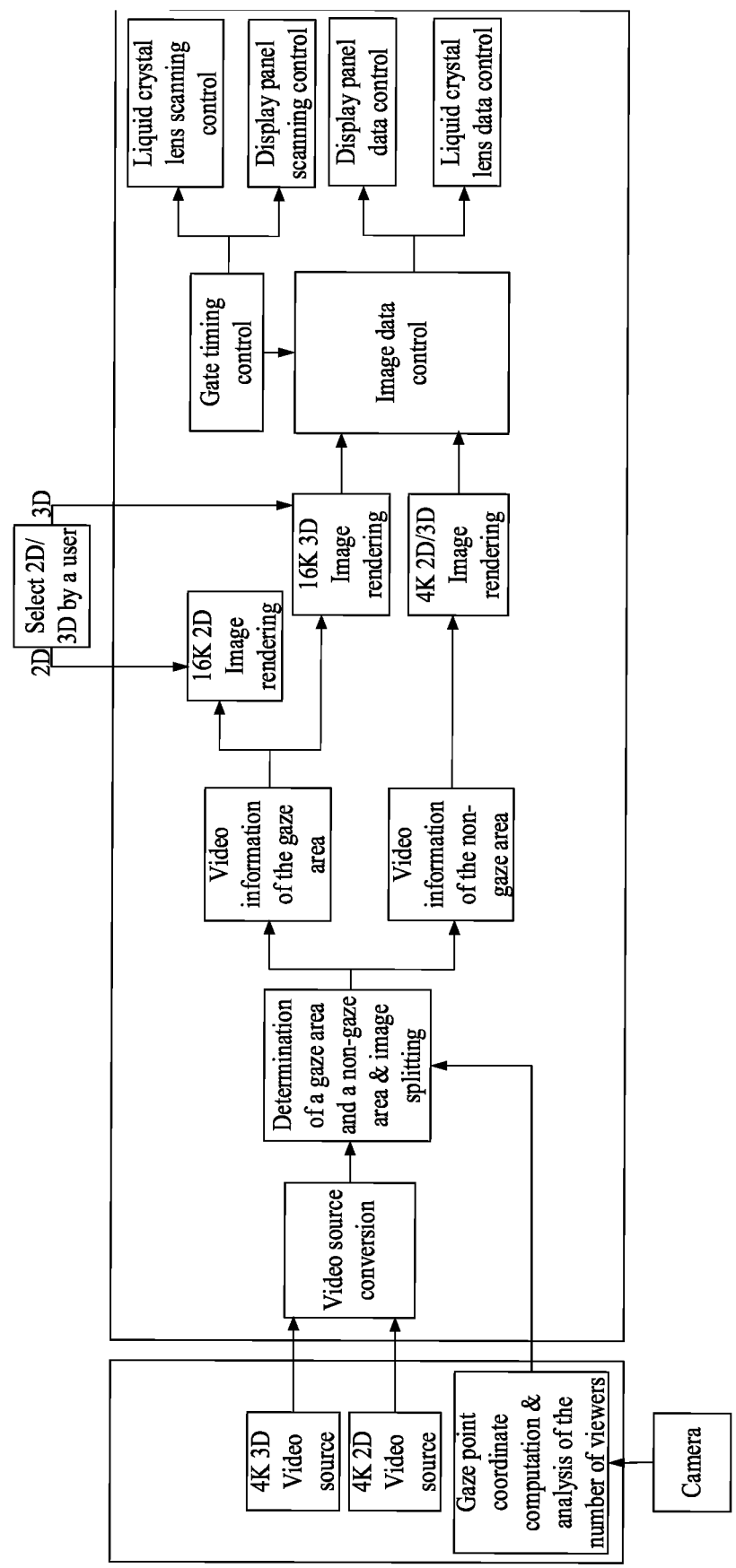
FIG. 16 is a schematic diagram of a system architecture of a display device according to an embodiment of the present disclosure.

FIG. 16 is a schematic diagram of a system architecture of a display device according to an embodiment of the present disclosure.

As shown in FIG. 16, when a user selects a 2D display mode, image data of a 2D video source are received. When a user selects a 3D display mode, image data of a 3D video source are received. A camera monitors positions of human eyes in real time, so as to determine coordinates of a gaze point of human eyes on the display device and analyze the number of people watching the display device. After determining the gaze position of human eyes on the display device, a displayed image is divided into a gaze area and a non-gaze area, and the gaze area is subjected to rendering at high resolution according to a selected mode of the user, and the non-gaze area is subjected to rendering at low resolution. Then, image data after image rendering are sent to a drive chip of a display panel, such that the display panel performs drive according to an instruction. In addition, a liquid crystal lens may be controlled to load appropriate scanning drive signals, so as to implement high-resolution image display in the gaze area and low-resolution image display in the non-gaze area, thereby reducing power consumption and achieving reasonable allocation of resources on the premise of guaranteeing user experience.

The above data processing and instruction sending operations are all implemented by a controller in the embodiment of the present disclosure, and the controller may be a graphics processing unit (GPU) and/or a field-programmable gate array (FPGA), which is not limited herein.

Although the preferred embodiments of the present disclosure have been described, additional alterations and modifications can be made to those embodiments by a person of ordinary skill once the basic inventive concepts are learned. Therefore, the appended claims are intended to be constructed to include the preferred embodiments and all alterations and modifications that fall within the scope of the present disclosure.

Apparently, a person of ordinary skill in the art can make various modifications and variations of the embodiments of the present disclosure without departing from the spirit and scope of the embodiments of the present disclosure. In this way, if these modifications and variations of the embodiments of the present disclosure fall within the scope of the claims of the present disclosure and their equivalent technologies, the present disclosure is also intended to encompass these modifications and variations.

What is claimed is:

1. A display device, comprising:
   a substrate;
   a plurality of pixel islands located on the substrate, wherein the pixel island comprises a plurality of sub-pixels of different colors, the sub-pixels are arranged in an array in a first direction and a second direction, sub-pixels of the same color in one pixel island are arranged in a row in the first direction, sub-pixel rows of different colors are arranged in the second direction, and the first direction and the second direction intersect with each other;
   a plurality of data lines arranged in the first direction and extending in the second direction, wherein sub-pixels arranged in a same column in the second direction are connected to a same data line;
   a multiplexing circuit located in the second direction at a side of an area where the pixel islands are located, wherein the data lines are connected to the multiplexing circuit separately;
   a drive chip located in the second direction at a side, facing away from the pixel island, of the multiplexing circuit, wherein the multiplexing circuit is connected to the drive chip;
   a controller connected to the drive chip, and configured to provide a drive signal for the drive chip; and
   a microlens layer located at a side, facing away from the substrate, of the pixel island, the microlens layer modulating emergent light of the pixel island, so as to map the sub-pixels in the pixel island into a pixel array and implement three-dimensional display on same; wherein
   sub-pixel columns in one pixel island are divided into a plurality of sub-pixel groups in the first direction, and numbers of the sub-pixel columns in the sub-pixel groups are identical to each other; and
   the multiplexing circuit comprises a plurality of first multiplexing units arranged in the first direction, each of the first multiplexing units comprises one input end and a plurality of output ends, the first multiplexing units are connected to the sub-pixel groups in a one-to-one correspondence mode, the output ends of each of the first multiplexing units are connected to data lines corresponding to the sub-pixel groups respectively, and the input end of each of the first multiplexing units is connected to the drive chip.

2. The display device according to claim 1, the multiplexing circuit further comprises:
   a plurality of first-switch control signal lines extending in the first direction and arranged in the second direction; wherein
   each of the first multiplexing units comprises: a plurality of first-switch transistors, control poles of the first-switch transistors are connected to the first-switch control signal lines, first poles of the first-switch transistors are connected to the output ends of the each of the first multiplexing units, and second poles of the first-switch transistors are connected to the input end of the each of the first multiplexing units; and
   in each of the first multiplexing units, the control poles of the first-switch transistors are connected to different first-switch control signal lines respectively, and the first poles of the first-switch transistors are connected to different output ends of the each of the first multiplexing units respectively.

3. The display device according to claim 2, wherein the multiplexing circuit further comprises:
   a plurality of control units located in the second direction at a side, facing away from the pixel island, of the first multiplexing units, wherein the control units are arranged in the first direction, each of the control units comprises an input end and an output end, and the control units are connected to the first multiplexing units in a one-to-one correspondence mode; and the output end of each of the control units is connected to the input end of corresponding first multiplexing unit, and the input end of the each of the control units is connected to the drive chip.

4. The display device according to claim 3, wherein the multiplexing circuit further comprises:
   a control signal line extending in the first direction, wherein
   each of the control units comprises: a control switch transistor, a control pole of the control switch transistor is connected to the control signal line, a first pole of the control switch transistor is connected to the output end of the each of the control unit, and a second pole of the control switch transistor is connected to the input end of the each of the control unit.

5. The display device according to claim 4, wherein the multiplexing circuit further comprises:
   a plurality of second multiplexing units located in the second direction at the side, facing away from the pixel island, of the first multiplexing units, wherein the second multiplexing units are arranged in the first direction; each of the second multiplexing units comprises a plurality of input ends and a plurality of output ends, and a quantity of the input ends is less than a quantity of the output ends; and the second multiplexing units are connected to a plurality of pixel islands arranged in the first direction in a one-to-one correspondence mode, the output ends of the second multiplexing units are connected to data lines corresponding to the sub-pixel columns in the pixel islands respectively, and the input ends of the second multiplexing units are connected to the drive chip separately.

6. The display device according to claim 5, wherein the multiplexing circuit further comprises:
   a plurality of second-switch control signal lines extending in the first direction and arranged in the second direction; and
   a plurality of third-switch control signal lines extending in the first direction and arranged in the second direction, wherein each of the second multiplexing units comprises: a plurality of second-switch transistors and a plurality of third-switch transistors;
a control pole of each of the second-switch transistors is connected to the second-switch control signal lines, a first pole of each of the second-switch transistors is connected to the output end of each of the second multiplexing units, a second pole of each of the second-switch transistors is connected to a first pole of each of the third-switch transistors, a control pole of each of the third-switch transistors is connected to the third-switch control signal lines, and a second pole of each of the third-switch transistors is connected to the input end of each of the second multiplexing units;
in each of the second multiplexing units, control poles of second-switch transistors connected to a same pixel island are connected to a same second-switch control signal line, control poles of second-switch transistors connected to different pixel islands are connected to different second-switch control signal lines, and second poles of second-switch transistors connected to sub-pixel columns at a same position in the pixel islands are connected to each other;
in each of the second multiplexing units, the third-switch transistors correspond to one of pixel islands connected to each of the second multiplexing units, and in the third-switch transistors and second-switch transistors corresponding to the pixel island, first poles of the third-switch transistors are connected to second poles of the second-switch transistors respectively;
in each of the second multiplexing units, the third-switch transistors are divided into a plurality of third-switch transistor groups in the first direction, and a quantity of the third-switch transistor groups equals a quantity of sub-pixel groups comprised in one pixel island; and
in each of the third-switch transistor groups, control poles of the third-switch transistors are connected to different third-switch control signal lines respectively, and second poles of the third-switch transistors are connected to a same input end of each of the second multiplexing units.

7. The display device according to claim 6, further comprising:
a plurality of gate lines extending in the first direction and arranged in the second direction, wherein sub-pixels arranged in a same row in the first direction are connected to a same gate line; and
a gate drive circuit located in the first direction at one side or two sides of an area where the pixel island is located, wherein the gate lines are connected to the gate drive circuit separately, wherein
the gate drive circuit comprises a plurality of gate drive units arranged in the second direction, the gate drive units are cascaded with each other in the second direction, and the gate drive units independently scan corresponding sub-pixel rows.

8. The display device according to claim 7, wherein each of the pixel islands comprises sixteen red sub-pixels, sixteen green sub-pixels and sixteen blue sub-pixels, the red sub-pixels, the green sub-pixels and the blue sub-pixels are arranged in three rows in the first direction and sixteen columns in the second direction, and each of the pixel islands is mapped by the microlens layer to form sixteen pixels arranged in four rows and four columns; sub-pixels in each of the pixel islands are divided into four sub-pixel groups in the first direction, and each of the sub-pixel groups comprises four sub-pixel columns; and
the multiplexing circuit comprises four first-switch control signal lines, each of the first multiplexing units comprises four first-switch transistors, control poles of the four first-switch transistors are connected to the four first-switch control signal lines respectively, first poles of the four first-switch transistors are connected to data lines corresponding to four sub-pixel columns in one sub-pixel group, and second poles of the four first-switch transistors are connected to each other to the drive chip.

9. The display device according to claim 8, wherein each of the first multiplexing units is connected to the drive chip through one corresponding control unit; and
the multiplexing circuit comprises one control signal line, and each of the control units comprises one control switch transistor; control poles of the control switch transistors are connected to the control signal line, a first pole of the control switch transistor in one control unit is connected to the second poles of the four first-switch transistors in one first multiplexing unit, and a second pole of the control switch transistor is connected to the drive chip.

10. The display device according to claim 9, wherein the multiplexing circuit comprises two second-switch control signal lines and four third-switch control signal lines;
each of the second multiplexing units is correspondingly connected to two pixel islands arranged in the first direction, and the two pixel islands are a first pixel island and a second pixel island;
each of the second multiplexing units comprises thirty-two second-switch transistors, sixteen second-switch transistors in each of the second multiplexing units are connected to data lines of the first pixel island respectively, and the other sixteen second-switch transistors are connected to data lines of the second pixel island respectively;
control poles of the sixteen second-switch transistors corresponding to the first pixel island are connected to one of the second-switch control signal lines, and control poles of the sixteen second-switch transistors corresponding to the second pixel island are connected to the other second-switch control signal line; first poles of the second-switch transistors corresponding to the first pixel island are connected to data lines of the first pixel island respectively, and first poles of the second-switch transistors corresponding to the second pixel island are connected to data lines of the second pixel island respectively; and second poles of two second-switch transistors corresponding to sub-pixel columns located at same positions in the first pixel island and the second pixel island are connected to each other;
each of the second multiplexing units comprises sixteen third-switch transistors, the sixteen third-switch transistors correspond to the first pixel island, and the sixteen third-switch transistors are divided into four third-switch transistor groups in the first direction; and
control poles of four third-switch transistors in one third-switch transistor group are connected to the four third-switch control signal lines respectively, a second pole of second-switch transistors corresponding to a same sub-pixel column is connected to a first pole of the third-switch transistor, and second poles of the four third-switch transistors are connected to one another and connected to the drive chip.

11. The display device according to claim 1, wherein the microlens layer comprises at least one liquid crystal lens layer.

12. A drive method for the display device according to claim 1, comprising:
  determining a gaze area and a non-gaze area of a user on the display device in real time; and
  driving the gaze area to implement image display at first resolution, and driving the non-gaze area to implement image display at second resolution, wherein the first resolution is higher than the second resolution.

13. The drive method according to claim 12, wherein the display device comprises a camera; and
  the determining a gaze area and a non-gaze area of a user on the display device in real time comprises:
  controlling the camera to photograph eyes of the user in real time;
  determining the gaze area of the user on the display device according to an image shot by the camera; and
  determining a remaining area on the display device except the gaze area as the non-gaze area.

14. The drive method according to claim 13, wherein the determining the gaze area of the user on the display device according to an image shot by the camera comprises:
  determining positions of a left eye and a right eye of the user relative to a display surface of the display device according to the image shot by the camera;
  determining a left-eye gaze area of the left eye of the user on the display device and a right-eye gaze area of the right eye of the user on the display device respectively according to the positions of the left eye and the right eye of the user relative to the display surface of the display device and a distance between the user and the display device; and
  using an overlap area of the left-eye gaze area and the right-eye gaze area as the gaze area of the user on the display device.

15. The drive method according to claim 14, wherein a single-eye gaze area of the user on the display device is determined in a formula as follows:

$$S=\pi(A \tan 15°)^2;$$

wherein S represents the single-eye gaze area of the user on the display device, and A represents the distance between the user and the display device.

16. The drive method according to claim 12, wherein before the driving the gaze area to implement image display at first resolution, and driving the non-gaze area to implement image display at second resolution, the drive method further comprises:
  determining a display mode selected by the user; and
  the driving the gaze area to implement image display at first resolution, and driving the non-gaze area to implement image display at second resolution comprise:
  driving the gaze area to implement two-dimensional image display at the first resolution, and driving the non-gaze area to implement two-dimensional image display at the second resolution under the condition that the display mode selected by the user is a two-dimensional display mode; and
  driving the gaze area to implement three-dimensional image display at the first resolution, and driving the non-gaze area to implement two-dimensional image display at the second resolution under the condition that the display mode selected by the user is a three-dimensional display mode; and alternatively, driving the gaze area to implement three-dimensional image display at the first resolution, and driving the non-gaze area to implement three-dimensional image display at the second resolution under the condition that the display mode selected by the user is a three-dimensional display mode.

17. The drive method according to claim 16, wherein the driving the gaze area to implement two-dimensional image display at the first resolution, and driving the non-gaze area to implement two-dimensional image display at the second resolution under the condition that the display mode selected by the user is a two-dimensional display mode comprise:
  receiving two-dimensional image data, performing image rendering on the two-dimensional image data at the first resolution for the gaze area, and performing image rendering on the two-dimensional image data at the second resolution for the non-gaze area; and
  controlling first-switch control signal lines corresponding to the gaze area to sequentially output active level signals, sequentially turning on first-switch transistors in a first multiplexing unit to transmit different two-dimensional image data, controlling first-switch control signal lines corresponding to the non-gaze area to simultaneously output active level signals, simultaneously turning on the first-switch transistors in the first multiplexing unit to transmit a same two-dimensional image data, driving the gaze area to implement the two-dimensional image display at the first resolution, and driving the non-gaze area to implement the two-dimensional image display at the second resolution;
  wherein the driving the gaze area to implement three-dimensional image display at the first resolution, and driving the non-gaze area to implement three-dimensional image display at the second resolution under the condition that the display mode selected by the user is a three-dimensional display mode comprise:
  receiving three-dimensional image data, performing image rendering on the three-dimensional image data at the first resolution for the gaze area, and performing image rendering on the three-dimensional image data at the second resolution for the non-gaze area; and
  controlling first-switch control signal lines corresponding to the gaze area to sequentially output active level signals, sequentially turning on first-switch transistors in a first multiplexing unit to transmit different three-dimensional image data, controlling first-switch control signal lines corresponding to the non-gaze area to simultaneously output active level signals, simultaneously turning on the first-switch transistors in the first multiplexing unit to transmit the same three-dimensional image data, driving the gaze area to implement the three-dimensional image display at the first resolution, and driving the non-gaze area to implement the three-dimensional image display at the second resolution;
  wherein the driving the gaze area to implement three-dimensional image display at the first resolution, and driving the non-gaze area to implement two-dimensional image display at the second resolution under the condition that the display mode selected by the user is a three-dimensional display mode comprise:
  receiving three-dimensional image data, and converting three-dimensional image data corresponding to the non-gaze area into two-dimensional image data;
  performing image rendering on the three-dimensional image data at the first resolution for the gaze area, and performing image rendering on the two-dimensional image data at the second resolution for the non-gaze area; and controlling first-switch control signal lines corresponding to the gaze area to sequentially output active level signals, sequentially turning on first-switch transistors in a first multiplexing unit to transmit different three-dimensional image data, controlling first-switch control signal lines corresponding to the non-gaze area to simultaneously output active level signals, simultaneously turning on the first-switch transistors in the first multiplexing unit to transmit the same two-dimensional image data, driving the gaze area to implement the three-dimensional image display at the first resolution, and driving the non-gaze area to implement the two-dimensional image display at the second resolution.

18. The drive method according to claim 17, wherein scanning duration of a gate drive unit corresponding to the gaze area is longer than scanning duration of a gate drive unit corresponding to the non-gaze area.

19. The drive method according to claim 18, further comprising:

increasing a drive current of the drive chip for the non-gaze area, and making a difference between charging degrees of sub-pixels in the gaze area and the non-gaze area less than a set threshold.

20. The drive method according to claim 12, wherein a gate drive circuit of the display device comprises a plurality of gate drive units, and a multiplexing circuit of the display device further comprises a plurality of second multiplexing units and a plurality of control units;

the drive method comprises:

driving control switch transistors of the control units to keep turned-off;

under the condition that a plurality of adjacent pixel islands are driven to load the same image data, controlling an output signal of a gate drive unit connected to an $n^{th}$ row of sub-pixels and an output signal of a gate drive unit connected to a $n+3^{th}$ row of sub-pixels to be the same, wherein n is an integer greater than or equal to 1; and controlling second-switch control signal lines to simultaneously output active level signals, simultaneously turning on second-switch transistors in the second multiplexing unit, and loading the same image data by the plurality of adjacent pixel islands; and under the condition that pixel islands are driven to load different image data, controlling second-switch control signal lines to sequentially output active level signals, sequentially turning on second-switch transistors connected to different pixel islands in the second multiplexing unit, and loading different image data by the pixel islands; and a drive method for the same pixel island comprises:

controlling third-switch control signal lines to simultaneously output active level signals, and simultaneously turning on third-switch transistors in a second multiplexing unit to transmit the same image data; or controlling third-switch control signal lines to sequentially output active level signals, and sequentially turning on third-switch transistors in a second multiplexing unit to transmit different image data.

* * * * *